United States Patent [19]

Wilensky

[11] Patent Number: 5,167,838
[45] Date of Patent: * Dec. 1, 1992

[54] THREE PHASE SEPARATION PROCESS

[76] Inventor: Joseph Wilensky, 44 So. Adams St., Apt. 131, Denver, Colo. 80209

[*] Notice: The portion of the term of this patent subsequent to Jan. 28, 2009 has been disclaimed.

[21] Appl. No.: 814,564

[22] Filed: Dec. 30, 1991

Related U.S. Application Data

[63] Continuation-in-part of Ser. No. 701,452, May 15, 1991, Pat. No. 5,084,187.

[51] Int. Cl.$^5$ .............................. C02F 1/22; B01D 9/04
[52] U.S. Cl. .................................. 210/768; 210/774; 210/805; 210/808; 62/532
[58] Field of Search ............... 210/742, 768, 774, 805, 210/808; 62/532, 533, 48.2; 159/DIG. 5

[56] References Cited

U.S. PATENT DOCUMENTS

| | | | |
|---|---|---|---|
| 2,896,419 | 7/1959 | Thompson | 62/541 |
| 2,974,102 | 3/1961 | Williams | 62/533 |
| 3,070,969 | 1/1963 | Ashley et al. | 62/537 |
| 3,098,733 | 7/1963 | Rosenstein et al. | 62/535 |
| 3,213,633 | 10/1965 | Rosenstein et al. | 62/535 |
| 3,214,371 | 10/1965 | Tuwiner | 62/533 |
| 3,364,690 | 1/1968 | Torobin | 62/534 |
| 3,474,635 | 10/1969 | Rowe, Jr. | 62/533 |
| 3,525,230 | 8/1970 | Smith | 62/534 |
| 3,664,145 | 5/1972 | Johnson | 62/537 |
| 3,779,030 | 12/1973 | Best | 62/541 |
| 3,856,492 | 12/1974 | Klass | 62/533 |
| 4,236,382 | 12/1980 | Cheng | 62/537 |
| 4,505,728 | 3/1985 | Cheng | 62/542 |
| 4,699,642 | 10/1987 | Perry et al. | 62/541 |
| 5,084,187 | 1/1992 | Wilensky | 210/768 |

FOREIGN PATENT DOCUMENTS 78164   5/1983   European Pat. Off. .............. 62/532

OTHER PUBLICATIONS

Journal of Chemical and Engineering Data, vol. 15, No. 1 (1970) pp. 67–71.

Primary Examiner—Robert A. Dawson
Assistant Examiner—Sun Uk Kim
Attorney, Agent, or Firm—Dorr, Carson, Sloan & Peterson

[57] ABSTRACT

A solute can be separated from a solute/solvent solution by dissolving a gas-forming material into said solution and then adjusting the temperature, pressure and solute concentration of a resulting single phase composite liquid such that a Joule-Thompson free expansion of said composite liquid will produce a three phase separation of its components.

62 Claims, 5 Drawing Sheets

THREE PHASE SEPARATION PROCESS

RELATED PATENTS

This patent application is a continuation-in-part of U.S. patent application Ser. No. 701,452 filed May. 15, 1991, U.S. Pat. No. 5,084,187, which also is entitled "Three Phase Separation Process."

BACKGROUND OF THE INVENTION

1. Field Of The Invention

This invention is generally concerned with the use of freezing conditions in order to accomplish a degree of separation of a solvent and/or of a solute from a solute/solvent liquid solution. The herein disclosed processes have many useful ecological and industrial purposes, but they are especially well suited for: (1) converting seawater, brackish water, etc. into potable water, (2) recovering metals such as magnesium from seawater or other salt-containing bodies of water, (3) demineralizing "fresh" waters used to make carbonated beverages and (4) recovering solutes and/or solvents from industrial solute/solvent solutions.

Numerous methods and/or systems have been suggested and/or developed for employing freezing conditions to produce potable water or other "pure" solvents or solutes from solute/solvent solutions. Most of these processes have not, however, experienced wholehearted economic and/or technical acceptance. For example, one of the principal problems inherent in most desalination processes which employ freezing conditions as their modus operandi is their inability to produce potable water at economically acceptable costs. That is to say that not only must a desalination process be able to produce large volumes of potable water, it also must be able to do so at locally acceptable costs. Cost considerations are particularly important to this art because many areas of the world having the most acute potable water shortages also are characterized by their very low income levels.

In many processes employing freezing conditions to produce potable water, seawater is simply frozen to produce an ice product and/or flash-frozen to produce a water vapor product which is recondensed to obtain pure water. Both of these freezing techniques require a great deal of expensive refrigeration and/or compressor capacity. The flash freezing techniques are especially expensive because they employ vacuum/freezer apparatus wherein a vacuum is created in order to evaporate large volumes of water in the form of water vapor. Such evaporation can only be accomplished by the expenditure of a great deal of mechanical work. It then must be condensed back to water by another large expenditure of mechanical work. This all goes to say that the refrigeration, vacuum creation and condensation steps of such processes require considerable amounts of mechanical and/or electrical energy which can only be obtained at high fuel costs and/or high capital equipment costs. Consequently, freezing and flash-freezing processes to produce potable water or other "pure" liquid solvents have not been heretofore widely employed.

2. Description of the Prior Art

Some representative freezing techniques heretofore suggested or used for the production of potable water from seawater are taught in the following patent references. They are more or less representative of this entire art. For example, U.S. Pat. No. 4,236,382 teaches a desalination process wherein a deaerated, ice water solution is first flash vaporized under a highly reduced pressure to form a low pressure water vapor brine and ice crystals. The ice is cleansed of surface brine in a counter-washer and then melted inside heat conductive conduits. Low pressure water vapor is also desublimed to form a desublimate (ice) on the outside of conduits which are specially designed for this purpose. This particular process also employs the latent heat of desublimation of the desublimate in order to supply the heat needed in the ice making portion of the process.

U.S. Pat. No. 3,664,145 teaches a method for separating a solvent (e.g., water) in substantially pure form from a solution (e.g., seawater) wherein a vacuum freezer is employed in order to produce vapors and a slurry of solvent and solute. The product materials are separated by various mechanical steps which form a large part of this particular patent disclosure.

U.S. Pat. No. 3,070,969 teaches a process which also employs vacuum freezing conditions to separate dissolved salts, such as those found in seawater, from a solvent solution. The seawater is vacuum frozen by use of a novel arrangement of equipment components in order to both concentrate solute salts contained in the liquid component of the solution and in order to collect the solvent component of the solution in the form of a frozen solvent material (e.g., ice).

U.S. Pat. No. 3,214,371 teaches a desalination process which is based upon formation of large ice crystals in brine through the use of certain water clathrate substances such as propane hydrate. The ice crystals are separated from the brine (and from the clathrate substance) and then melted in a process employing the latent heat absorbing capacity of the ice to further promote formation of a hydrate produced from a brine and water clathrate feedstock.

U.S. Pat. No. 4,505,728 teaches a vacuum freezing, multiple phase transformation process employing flash vaporization in a vacuum freezing zone in order to produce water vapor which is then condensed to water.

U.S. Pat. No. 3,213,633 teaches a freeze concentration process employing a refrigerant vapor in order to freeze water. This is accomplished by direct contact of the water with a totally vaporizable liquid refrigerant.

European Patent 78-164 teaches a purification process based upon flash evaporation of a solvent from a solution at a pressure below the triple point of the solvent.

Again, the principal drawback with most of the above noted freezing or vacuum freezing methods is that the amount of pure solvent which can be produced by such methods is directly proportional to the size and efficiency of the mechanical compressor(s) needed to produce the refrigeration and/or vacuum freeze conditions necessary to carry out such processes. Consequently, the extremely high costs of vacuum freeze processes such as these usually can only be justified in processes wherein the value of the end product (e.g., blood plasma and freeze-dried coffee) is very high. Such processes are not, however, normally used to produce potable water, not because they do not work, but rather because they are prohibitively expensive to build, maintain and operate in the context of a product (e.g., water) of relative low economic value.

In response to all of these technical problems and economic circumstances, the herein disclosed processes are intended to provide methods, systems and apparatus for separating a solvent (e.g., potable water), in a highly refined or even substantially pure form, from a solute/solvent solution (e.g., seawater) at substantially lower costs than those which can be obtained by conventional refrigeration and/or flash freezing methods. These processes also can be equally well employed to obtain a solute product (e.g., a salt) from a solute/solvent solution (e.g., seawater).

The herein disclosed three phase separation processes do not require any compressor equipment; or, if compressor equipment is in fact employed, it need not have a great deal of compressor capacity relative to that required by the above-noted prior art flash vaporization processes. It should also be noted that small, conventional, mild steel, equipment such as piping, low pressure vessels and heat exchangers will normally suffice for use in the processes described in this patent disclosure. Moreover, the labor and maintenance requirements of applicant's processes are much less than those generally associated with flash-freezing processes.

SUMMARY OF THE INVENTION

The previously noted technical problems and/or economic drawbacks can be avoided, or at least significantly mitigated, by use of applicant's three phase separation processes. These processes are based upon evaporation of one or more dissolved, gas-forming material(s) (e.g., liquid carbon dioxide) from a solute/solvent solution which has been specially prepared with respect to its temperature, pressure and solute concentration. For the purposes of this patent disclosure the expression "gas-forming" material refers to the material's ability to go into a gaseous state at those temperature and pressure conditions existing after a Joule-Thompson free expansion step of this process. It also should be noted in passing that for the purposes of this patent disclosure the terms "gas" and "vapor" will be used interchangeably. Regardless of terminology, however, it is the release of the gas-forming material which "drives" applicant's processes. The release of the gas-forming material takes place as a result of a Joule-Thompson free expansion of a resulting solution of gas-forming material and solute/solvent after the resulting solution has been properly prepared (by methods hereinafter more fully described) to undergo the Joule-Thompson free expansion in a manner which produces the three phase separation.

One of the most fundamental embodiments of applicant's invention is a process for separating a solute from a solvent which together constitute a solute/solvent solution starting material having an initial solute concentration in order to obtain a pure solvent product; this embodiment generally comprises the following process steps: (1) dissolving a gas-forming material into the solute/solvent solution in order to produce a dissolved gas/solute/solvent solution; (2) placing the dissolved gas/solute/solvent solution under a nominal high pressure; (3) lowering the temperature of the dissolved gas/solute/solvent to a jumping off temperature (which is hereinafter much more fully described) in order to produce a single phase liquid having a solute concentration, a temperature and a nominal high pressure which are such that a release of pressure from the single phase liquid from the nominal high pressure to a nominal low pressure results in evaporation of substantially all of the gas-forming material as a gas which takes its heat of vaporization in an amount such that the temperature of an entire mass of the single phase liquid is lowered to a triple point temperature which approaches the eutectic temperature of said single phase liquid; (4) subjecting the single phase liquid to a Joule-Thompson free expansion into a vessel having a nominal system low pressure and thereby obtaining three phases of resultant materials which each have a temperature which approaches the eutectic temperature of the single phase liquid and wherein said three phases of resultant materials comprise a gas phase product containing the gas-forming material, a liquid phase product containing a solute concentration greater than that of the solute concentration of the solute/solvent solution starting material and a solid phase product containing a solute concentration which is substantially less than the solute concentration of the solute/solvent solution starting material (i.e., the solid phase product is a nominally "pure" product, but for surface contamination nation thereof by the liquid phase product); (5) collecting at least one of the three phases of resultant materials as a product of the process and (6) recycling at least one of the three phases of resultant materials back into an earlier stage of the process.

Applicant's processes also can be specifically directed at recovery of a solid phase, solute product from a solute/solvent starting material. For example, a salt such as magnesium carbonate and/or sodium chloride can be recovered as a solid phase product of the herein disclosed processes by precipitating such solutes as solid phase products obtained as a result of using appropriate solute concentration, temperature and/or pressure conditions with respect to the single phase liquid solution which undergoes the Joule-Thompson free expansion step of this process. Generally speaking, the formation of a solid phase solute product (e.g., a solid phase salt) rather than a solid phase solvent product (e.g., ice), can be viewed as increasing the weaker than eutectic concentration of the starting material component by solidification and removal of the purified starting material component originally present in excess of eutectic composition. When this principle is applied to the case of a saturated solution being cooled to super saturation, the result will be precipitation of excess solute whereupon the liquid phase approaching eutectic composition preferably is entirely returned to a reservoir of the starting material.

For example, a process focusing on separating a solute (e.g., a salt in its solid phase form) from a solute/solvent solution starting material could generally comprise the following process steps: (1) dissolving into a solute/solvent solution, a controlled amount of a fluid X (which will constitute a vapor phase at a system low temperature and pressure state which will exist after a Joule-Thompson free expansion step of this process), in order to produce a fluid X/solute/solvent solution; (2) placing the fluid X/solute/solvent solution under a nominal high pressure; (3) lowering the temperature of the fluid X solute/solvent solution to a jumping off temperature in order to produce a single phase liquid solution having a solute concentration, temperature and nominal high pressure which are such that a release of the nominal high pressure from said single phase liquid solution to a nominal low pressure will result in production of a solid-liquid-gas equilibrium state (triple point) of the single phase liquid solution which is characterized by the production of a solid phase product comprised of substantially pure solute; (4) subjecting the single phase liquid solution to a Joule-Thompson free expansion into a vessel having the nominal system low pressure and thereby: (a) producing a solid-liquid-gas equilibrium state (triple point) of the single phase liquid solution which is characterized by the production of a solid phase product comprised of substantially pure solute (but for surface contamination by the liquid phase product), (b) evaporating all of the fluid X as a vapor which takes its heat of vaporization in an amount such that the temperature of an entire mass of the single phase liquid solution is lowered to a triple point temperature which approaches the eutectic temperature of the single phase liquid solution, (c) evolving a portion of the solute as a pure solid phase product (e.g., a precipitated salt) and (d) forming a liquid product comprised of the solvent of the starting material and any remaining solute (i.e., any solute not contained in the pure, solid phase, solute product) and (5) separating the pure solid phase product from the liquid phase product. Thus, the pure solid phase product can be the "end product" of the process. After the solid phase solute product is removed from it, the liquid phase product can be returned to an earlier stage of the process for heat exchange and/or either returned to a starting material reservoir or suitably disposed of. In one particularly preferred embodiment of this invention the liquid product of the Joule-Thompson expansion will be entirely returned to the inventory of starting material following separation of the solid phase of purified component originally present in excess of eutectic composition. The return of the liquid phase product may also be accompanied by certain hereinafter described "blowdown" procedures. Similarly, the vapor phase product can be recycled back to an earlier stage of this process and reintroduced therein, either as a vapor and/or as a liquid which is formed by compressing said vapor.

Applicant's three phase separation procedures can be used as the basis for several highly preferred embodiments of the herein disclosed processes. Generally speaking, these highly preferred embodiments will involve the processes' reuse of the liquid phase product and/or the vapor phase product of the Joule-Thompson free expansion. For example, in one particularly preferred embodiment of applicant's invention, a quantity of the liquid phase product of the Joule-Thompson free expansion is recycled back to some previous point in the process in order to adjust the solute concentration of an incoming portion of a starting material solution to that of the combined solution which is to undergo the Joule-Thompson free expansion step. This recycled quantity can vary with any given process, but in the most preferred embodiments of the "liquid phase recycle" version of applicant's invention, the recycled quantity of liquid phase product will be a constant quantity designed to achieve a particular "steady state" operation. In many cases this recycled quantity will have a solute concentration which, being the same as that of the net liquid product, closely approximates the eutectic concentration of the starting material and the composite solution which undergoes the Joule-Thompson free expansion. However, there also may be cases where the recycled quantity is adjusted for economics which warrant less than the eutectic concentration.

Stated in process patent claim language this highly preferred liquid phase recycle version of applicant's process for separating a solute from a solvent, which together constitute a solute/solvent solution starting material having an initial solute concentration and an initial temperature $T_1$, will comprise: (1) combining the solute/solvent solution with a constant recycle quantity of a liquid product of increased solute concentration obtained from a Joule-Thompson free expansion step of this process and used as a circulating inventory of said liquid product of increased solute concentration which is recycled in an amount adjusted to control a solute concentration of a single phase liquid combined solution comprised of a portion of the starting material and a constant recycle quantity of the liquid product of increased solute concentration; (2) dissolving into the combined solution, under a system high pressure state, a controlled amount of a fluid material X which will constitute a vapor phase at a system low temperature and pressure state which will exist after the Joule-Thompson free expansion step, in order to produce a fluid material X/solute/solvent solution which constitutes a single phase, composite solution of a given overall composition; (3) removing any heat òf solution and/or heat of condensation of the single phase, composite solution and removing sensible heat of said composite solution in a stage-wise manner so as to transit successive temperatures $T_2$ and $T_3$ in order to reach a lower jumping off temperature $T_4$ while still essentially at nominal high pressure; (4) releasing the high pressure in a Joule-Thompson free expansion to a system low pressure in order to spontaneously result in a system low temperature $T_5$ and thereby achieving a solid-liquid-gas equilibrium state (triple point) of the composite solution; while simultaneously: (a) evolving substantially all dissolved fluid material X into an evaporated gaseous phase which will have absorbed its heat of vaporization from any remaining solvent and any remaining solute; and (b) distributing any remaining solvent and solute into a solid phase product of pure solvent and a liquid phase product; and (5) separating the solid phase as a product, and (6) separating the liquid phase into a constant recycle quantity and a remaining "blowdown" quantity composed of total solute of the starting material and unsolidified remaining solvent of the starting material in proportions up to and approaching eutectic (solubility) proportions of the starting material solute and solvent.

Control of various parameters of these processes is of the utmost importance to their successful operation. Such control generally begins when controlled amounts of a gas-forming material (i.e., a material capable of forming a gas at the conditions existing just after the Joule-Thompson free expansion, e.g., $CO_2$ liquid, $CO_2$ gas, $SO_2$ gas, dry ice, etc.), at its given temperature, are dissolved into an incoming, controlled portion of a feed solution such as seawater. The gas-forming material also must be "controlled" in the sense that it must be "partially soluble" in the solution into which it is introduced. For the purposes of this patent disclosure, the term "partially soluble" should be taken to mean that the gas-forming material is both sufficiently soluble in the solute/solvent solution to readily dissolve into solution upon being injected into the solution and, concomitantly, be sufficiently "insoluble" in the liquid phase product of the Joule-Thompson free expansion such that (when the nominal high pressure of a nominal high state of the herein disclosed process is released to a nominal low pressure of the system's nominal low state), the gas-forming material will go into a gas phase in a manner such that there is sufficient reabsorption of the heat of vaporization of the gas to readily vaporize it and thereby effect a desired degree of chilling of any other materials present, i.e., chilling the solute and the solvent materials (as well as the vapor itself) to a temperature near the triple point temperature of a single phase solution. As will be seen in later portions of this patent disclosure (e.g., in an ensuing discussion of FIG. 2), this degree of chilling is the amount necessary in order that a given single phase liquid solution "almost" reach its "eutectic temperature" after dropping below the triple point temperature of the pure solvent.

Consequently, only slightly soluble gases such as nitrogen and air are not well suited to the practice of this process, at least in the context of aqueous systems since nitrogen and air are only very sparingly soluble in water. On the other hand, the gas which is formed as a result of the Joule-Thompson free expansion should not be so soluble that, when the system's nominal high pressure is released to the system's nominal low pressure, the gas will remain in solution, but rather will, under such low pressure, be virtually totally vaporized and, in so doing, take up its heat of vaporization from the materials surrounding it (i.e., from any remaining solute and solvent materials) and thereby cool said materials. Therefore, certain gases such as ammonia gas and hydrogen chloride gas, which are highly soluble in water and, hence, would not readily evaporate out of the solution under such low pressure conditions, are not well suited to the practice of this invention—at least in the context of aqueous systems.

Carbon dioxide gas and sulfur dioxide gas, by way of contrast, are much better suited to the practice of applicant's processes in aqueous systems since they will readily dissolve in aqueous solutions and readily evaporate under the low pressure conditions employed in applicant's processes. However, it should be noted that where the end product of the process is to be potable water, carbon dioxide is virtually the only suitable gas for the practice of this invention. That is to say that sulfur dioxide is suitable from a purely physical point of view, that is, with respect to its ability to first dissolve and then vaporize under the appropriate temperature and pressure conditions; but it is not suited in situations where "potable" water is the desired end product since any sulfur dioxide left in the solution will form acids which should not be ingested. At this point, it also should be noted that carbonated water, as well as "pure" water are each possible "potable" water end products of this process and that carbonated water-in many cases-will have a higher economic value than that of uncarbonated water.

The gas also should be of greater volatility than that of the solvent vapor (e.g., water vapor, hydrocarbon vapor, etc.) whatever it may be, in any particular embodiment of this process. The gas species also may be selected on the basis of other criteria as well, e.g., (1) non-toxicity, (2) low cost, (3) ready availability, etc.; but, regardless of any of its other attributes, the gas-forming material must be selected on the basis of its having an intermediate solubility with respect to the solvent component of the solute/solvent solution into which it is to be introduced (hence, its appellation in this patent application: "partially soluble") and its ability to vaporize as a result of applicant's Joule-Thompson free expansion. Stated another way, the solubility of the gas should be such that: (a) at the system's nominal high pressure (and temperature), the required amount of gas will completely dissolve in the solute/solvent solution, (b) at the system's nominal low pressure, the gas will be essentially totally evaporated and (c) the evaporation of the gas will be such that its reacquisition of its latent heat, when it evolves from the Joule-Thompson free expansion, will be sufficient to chill an entire mass of a single phase composite liquid material almost to its eutectic temperature.

As was previously noted, the processes of this patent disclosure are particularly well suited for producing potable water from the aqueous solvent component (i.e., pure water) of seawater. But, it also should be strongly emphasized that the herein disclosed processes can be readily employed to separate and/or recover virtually any dissolved solute component (e.g., salts of magnesium, sodium, potassium, etc.) from virtually any solvent component, (e.g., seawater, aqueous industrial fluid streams, non-aqueous industrial fluid streams, etc.). However, it also should be noted in passing that the processes of this patent disclosure are not particularly well suited for separations to be carried out with respect to solutions of solute concentrations of less than about 0.1% solute by weight, or for separating components of low relative volatilities. Generally speaking, such solutions are better separated by distillation procedures.

The processes of this patent disclosure also can be used in conjunction with various other processes (e.g., progressive lagoon evaporation processes, filtration processes, etc.), in order to recover a wide variety of products from a single liquid source (e.g., salt lake water or seawater) containing several solute species. For example, some of the more common elements found in seawater which can be recovered by applicants' process could include:

| Element | Concentration In Sea Water (mg/l) = ppm |
|---|---|
| Sodium | $1.05 \times 10^4$ |
| Magnesium | $1.35 \times 10^3$ |

Again, the herein disclosed processes can be readily used to recover either or both of these elements from seawater, but they are particularly well suited to the recovery of magnesium since magnesium carbonate will precipitate out of a $CO_2$/seawater solution before sodium chloride. Such magnesium can of course be used in the form of the salt in which it is recovered (e.g., magnesium carbonate), or the salt can be subsequently converted to its metal form. That is to say that magnesium—which heretofore has been precipitated from seawater as its hydroxide by mixing dolomite with a portion of sea water—may be recovered by applicant's process, preferable as its carbonate, in order to ultimately recover magnesium metal through the use of known electrolytic techniques which are used to convert magnesium chloride to magnesium metal. Hence, applicant's process can be used to simultaneously produce potable water and a liquid phase product having an increased solute concentration rich in magnesium. Indeed, the processes of this patent disclosure could be operated to precipitate a salt (e.g., magnesium carbonate) as a chief object of the process.

Furthermore, even though applicant's processes are primarily exemplified in this patent disclosure by their use in obtaining potable water from seawater, they also can be readily employed to obtain "pure" water from mineralized fresh water (i.e., "hard" water). Thus, "hard" or brackish water from non-sea water sources (e.g., water taken from "fresh" water sources) may be subjected to the herein described processes in order to obtain: drinking water, irrigation water, carbonated water, or water for production of other carbonated beverages such as soft drinks, beer and the like. The degree of "purity" of such waters will of course vary with the intended end purposes. For example, the U.S. Public Health Service has established that water for human consumption should contain no more than 500 parts per million (ppm) of dissolved solids. On the other hand, the purity of irrigation water may vary widely with the crop species and soil conditions; e.g., in some cases irrigation water may contain as high as 1,200 ppm of solids without adversely affecting certain crops.

It also should be emphasized that the herein disclosed process can be employed to recover solvents and/or solutes from industrial processes where water is not the solvent component and/or where water potability, if water is the solvent, is not a necessary attribute of a water end product of that industrial process. Thus, in such cases, sulfur dioxide could be employed in place of carbon dioxide since "potability" is not a necessary attribute of the water end product. In general then, the three phase separation processes described in this patent disclosure may be employed to separate the components of any solute/solvent solution as long as: (a) the solute component is dissolved in the solvent component, (b) as long as a gas can be dissolved into the solvent component and subsequently evaporated from a specially prepared solute/solvent solution and (c) as long as the solute concentration in the solute/solvent solution is at least about 0.1% by weight. In the case of producing a solid phase solvent product, there is of course also the further condition that the solvent in question must be capable of being frozen to a solid state by a Joule-Thompson free expansion of the solute/solvent solution under pressure and temperature conditions which are not prohibitively expensive to attain.

Consequently, the herein disclosed process also may be readily employed to great advantage in any number of industrial processes where there is a need to separate a solute from a solvent in which it is dissolved. Such industrial solvents might, for example, by any number of polar or non-polar liquids such as aromatic hydrocarbons, aliphatics esters, ethers, ketones, amines, nitrated and/or chlorinated hydrocarbons, phosphates, liquid sulfur dioxide, etc. Yet another example of the use of applicant's process in an industrial and/or pollution control context would be in conditioning sludges and hydrophilic colloids, for, say, facilitating dehydration operations. Consequently, applicant's process may be employed as a part of a wide variety of sewage treatment and/or pollution control processes.

By way of one further example of the potential industrial uses of the herein disclosed processes, it can be noted that various embodiments of this process may be employed to great advantage in order to recover dissolved salts from various industrial by-product fluids such as those released from pulping mills, cement factories, public utilities and the like. For example, in one highly preferred embodiment of this invention, where water is used as the solvent, but where its "potability" is not an issue, aqueous potassium compound solutions (e.g., its sulfate)—"potash" solutions—obtained from washing stack gases of cement kilns can be treated by the herein disclosed processes in order to concentrate a potash solute which they often contain. This is an important application for these processes because this form of potash has heretofore only been recovered by prior art separation methods in extremely dilute concentrations. Applicant's process can improve upon this situation by providing a way in which the potash can be concentrated to a point where it can be sold as a commercial product or at least more economically handled for disposal purposes.

It also should be noted in passing that, if need be, applicant's processes also can be made very compact because, for the most part, they require only small liquid pumps, rather than large compressors, as their only "moving parts". Consequently, they are also characterized by the fact that their use requires only relatively minor amounts of electric power. Again, in many cases no compressors whatsoever will be needed to practice applicant's processes. On the other hand, some preferred embodiments of the herein disclosed processes may in fact employ compressors. However, when they are used in applicant's processes, such compressors can be of a relatively small size since they are not called upon to create the vacuum conditions necessary to "flash" water vapor from a large volume of solvent, but rather are only used to compress those relatively small volumes of vapor phase products of the Joule-Thompson free expansion. In other words, where compressors are employed in the herein disclosed processes, they can be of a relatively small capacity because they are only called upon to recompress relatively small volumes of the vapor phase product (e.g., $CO_2$ vapor) rather than those much larger volumes of water vapor product which must be handled in those prior art processes which vaporize an entire volume of water in order to make it potable. It also should be pointed out that this process can be made into devices small enough for use in the home or in small, coin-operated, devices located in public places. Indeed, the process might even be used to produce ice from tap water in homes, restaurants and like-sized enterprises needing relatively small quantities of ice; that is to say that the process can be employed to produce ice even though the incoming water stream is already "potable" water. The advantage of these processes in this circumstance is their ability to produce ice without the use of Freon ® type gases which are known to be harmful to the earth's ecology and which are now under attack from several environmental quarters.

Moreover, given creation of the proper temperature, pressure and solute concentration conditions for a given single phase composite liquid solution, the three-phase separation phenomenon employed in the herein disclosed processes may be evoked under circumstances which can employ procedures, materials and apparatus that are already well known to the process engineering arts and/or which are readily available. The processes disclosed herein also may be employed over a very wide range of easily attainable temperatures and pressures in order to separate very small or very large quantities of solute from various solutions-even in those cases where the solute is in concentrations as low as about 0.1% by weight.

Lower operating pressures are, however, generally preferred simply because they make lower demands upon the equipment employed and/or on the power requirements needed to carry out applicant's processes. For example, applicant's low pressure requirements are illustrated by the fact that in the case of many aqueous solutions, the herein disclosed processes can be carried out using only: (1) nominal high pressures ranging from only about 20 psig to about 50 psig, (2) nominal low pressures at, or near, atmospheric pressure, and (3) about 3.5 volumes of carbon dioxide gas per volume of solution for aqueous solutions containing from about 2% to about 25% solute concentrations by weight. Application of applicant's processes to such systems will produce ice in amounts ranging from about one-tenth to about one-half the volume of the solution. More extreme operating conditions (e.g., use of greater nominal high pressures) may be used to produce greater process efficiencies, so long as the cost of attaining the more extreme operating conditions does not become prohibitively expensive.

Those skilled in this art also will appreciate that any solid phase product of these processes, such as ice for example, will be substantially "pure." However, such pure products will be contaminated with a liquid phase product with which it is associated (e.g., floating ice or precipitated salt will each be contaminated by the liquid phase product with which it is associated). For example, an ice product formed by applicant's process will be comprised of pure water, but it will be contaminated with surface brine by virtue of the fact that it will be floating on said brine. However, after the ice is removed from the recovery vessel, such brine can be washed away from the surface of the ice by washing the ice, e.g., with a "captive" amount of recycled pure water spray.

The efficacy of such relatively small volumes of gas in producing such relatively large volumes of a solid phase product (e.g., ice) also implies that it often will be economical to use relatively small compressors to reliquify the vapor phase products (e.g., $CO_2$ vapor) of these processes for subsequent reuse in the form of liquid carbon dioxide. That is to say that since relatively small volumes of a gas such as $CO_2$ can be used to produce relatively large volumes of ice in applicant's process, the cost of mechanically recompressing such relatively small volumes of gas generally will not be economically prohibitive. Again by way of contrast with the prior art, applicant's process could recompress the 3.5 volumes of $CO_2$ gas needed to freeze a substantial portion of one volume of an aqueous solution at economically acceptable costs, but could not operate economically if applicant's compressors were called upon to produce and handle the vapor volume which would be created if virtually the entire volume of applicant's liquid phase product had to be volatilized in order to separate a solute from the solution.

The vapor phase products of the herein disclosed processes also may be reused by directly injecting them (in their vapor phase) into the solute/solvent solution starting material and/or into a single phase liquid provided that such injection is done before said liquid attains the system's hereinafter described "brink" or "jumping off" temperature. Certain jet eductor systems hereinafter more fully disclosed can provide a very convenient means of introducing such vapor phase materials back into the solute/solvent solution. Moreover, the reintroduction of such vapor phase materials may be done by various combinations of such reintroduction procedures, e.g., jet eduction of gases accompanied by injection of liquid gas-forming materials which have been produced from such vapors by mechanical recompression means. However, in general the more economical versions of applicant's processes will recompress the vapor phase product to a liquid phase material such as liquid carbon dioxide.

As was previously noted, those skilled in this art also will appreciate that even though the three-phase separation described in the patent appliation forms the underlying principle of each of the herein described processes, several other variations on the theme of that fundamental process can be implemented. For example, any of these processes may be augmented to include a wide variety of additional concepts, materials and/or circumstances. For example, in the manner previously outlined, a solid phase solute product may result (e.g., by precipitation) at a given stage of a given process due to the fact that a solute physically exceeds its saturated solubility level in a liquid phase product material. Obviously, such a solid phase product also may be "forced" into existence by use of any number of appropriate process parameters (e.g., variations in chemical species, concentration, temperature, pressure, etc.). Again, those skilled in this art will appreciate that such a solid phase product also will be "pure", but may (as in the case of production of a solid phase solvent such as ice) be contaminated by surface liquid phase material such as brine into which the solute is precipitated. Such surface contamination of solutes can be removed by washing processes well known to the chemical process arts.

Moreover, a solid phase also may result (or be forced to result) from certain chemical reactions resulting from, say, the addition of a pressurizing gas. Production of insoluble carbonates, sulfates, sulfites would be examples of such a variation of the herein described processes. Similarly, a solid phase may appear or disappear (or be forced to appear or disappear) due to physical and/or chemical activities taking place in the course of certain severe temperature changes. Thus, for example, equilibria changes between carbonates and bicarbonates; sulfite and bisulfites, etc., caused by such temperature changes, may cause appearances or disappearances of certain chemical species. It should be noted here that applicant's separation process also can be accomplished in any quantity proportions of liquid solutions of any net remaining ingredients when the process is halted at some temperature which is appropriate to some predetermined solute/solvent concentration of the initial feed material. One particularly useful, and hence noteworthy, variation of the herein disclosed processes is the concept of circulation of a concentrated soluble carbonate in equilibrium with its bicarbonate as a means of introducing, pressurizing, and conveying carbon dioxide to the system. Use of this concept constitutes an especially effective means of controlled precipitation of certain pure, and valuable, insoluble carbonates of calcium, magnesium, etc. It also should be noted in passing that in the particular case of chlorination of potable water, seawater and the like, or in cleaning up certain objectional by-products of cement plants, etc., chlorine and certain hypochlorites of sodium, calcium, and/or magnesium may be removed by employment of several versions of applicant's processes.

It is also contemplated that production of certain products of the Joule-Thompson free expansion will affect these processes, as a whole. For example, production of certain products may affect or even dictate the choice of the point of introduction of the gas-forming fluid (e.g., $CO_2$, $SO_2$, etc.) into a given process stream. This choice of point of introduction may, in turn, affect the stream and composition of a particular receiving fluid, e.g., raw feed, circulating brine, recycle and/or combined fluid feeds, etc. It is also contemplated that the conditions of a given introduction and of a given removal of the gaseous and solid phases can constitute a specific feature chosen for a specific application of the process. Thus, for example, even though a brine stream such as that shown as item 44 in FIG. 3 may be returned to any given previous reintroduction point in the process, e.g., returned to point 43, such a brine stream could be just as well returned to virtually any other point in the overall system, e.g., it could be returned to point 21 (i.e., the inlet of a jet eductor). Obviously, the only limitation upon the return of such materials is that such returns should be accomplished before the Joule-Thompson free expansion takes place. In most cases, however, such returns also will be accomplished before the single phase composition attains the hereinafter more fully described "jumping off" temperature needed to produce the three-phase separation by the Joule-Thompson free expansion.

Those skilled in this art also will appreciate that any materials produced by applicant's processes may occur in widely differing amounts and degrees of contamination. Consequently, they may constitute a distinct advantage or a distinct disadvantage to any given overall version of this process from both the economical and/or the technical points of view. In any case, the collection and separation of such materials may be regarded as "secondary product(s)" of the herein described processes. Nonetheless, the recovery of such secondary product(s) also may constitute additional steps to any of the more fundamental processes of this patent disclosure. Moreover, depending upon the amounts actually present, or made possible, such secondary products may be permitted to accumulate through any or all of the several stages of the overall three phase separation process described in his patent disclosure. Thus, for example, solutes may be recovered by any one or more of the gamut of solid separation methods generally known to the process engineering arts, e.g., filtration, blow-down disposal, use of setting basins, thickening, etc.

Those skilled in this art will appreciate that the term "blow-down" describes a particularly convenient means of getting rid of small amounts of a foreign material such as a solute or precipitate. The fortuitous part of blow-down as it relates to this invention is that as long as any constant volume of an inventory is taken out at a point of purifying separation, the concentration of foreign material dissolved or suspended increases by accumulation in the inventory so that when the operation steadies to constancy, the process removes all of the entering foreign material, as long as enough is taken out to prevent letting the foreign material accumulate until the resulting fluid becomes too thick to handle. In any case, blow-down is a very convenient, automatic way of getting rid of small amounts of foreign material because no matter how much one takes out on a constant basis, its concentration of foreign material gets up to a point where the blow-down operation takes out exactly as much of it as one puts in originally. Thus, in a highly preferred embodiment of this invention, the processes described herein may further comprise separating a liquid phase into a constant recycle quantity and a remaining "blowdown" quantity composed of the starting material total solute and the unsolidified liquid remainder of starting material solvent in proportions up to and approaching eutectic (solubility) composition of the starting material components.

As a further aid to understanding the scope of this invention from its more technical points of view, it again should be considered that the closest prior art approaches to the processes of this patent disclosure are the "flash freezing" or "vacuum freezing" methods previously discussed. Again, these processes generally involve subjecting an aqueous solution to high vacuum conditions corresponding to those of the solid water's vapor pressure, below the unique "triple point" of water. As a result, the water content of the solute/solvent solutions employed in these prior art processes sublimes directly to vapor—rather than first melting to liquid water—while the temperature of the total mass falls below the triple point temperature.

These technical circumstances are to be contrasted with applicant's process wherein, in effect, use of a high-volatility gas is substituted for the prior art's forced evaporation of virtually all the solvent content of the solute/solvent solution. Having made this substitution, applicant's process must arrange or "contrive" certain of its process parameters so that a pressure/temperature "venue" is created which favors production of a "spontaneous" evaporation of the high-volatility gas. Such spontaneous evaporation of a relatively small volume of this gas has inherent economic advantages over those prior art processes based upon evaporations of large solvent volumes obtained by the expenditure of a great deal of mechanical work. Again, it is the elimination of the costs associated with such forced evaporations of large volumes of solvent that gives applicant's processes their economic advantages.

However, before discussing any further details of applicant's processes, certain technical temperature-phase relationships should be graphed, explained and then related to the fundamental teachings of this patent disclosure. For the purposes of this patent disclosure such temperature-phase relationships can be sufficiently understood by merely graphing them and noting what actually happens to a solute/solvent solution as it undergoes a Joule-Thompson free expansion of the type employed in applicant's processes. A much more thorough discussion of the underlying theoretical considerations upon which this invention is based can be found in the *International Encyclopedia of Physical Chemistry and Chemical Physics*, published by Gamon Press London, Topic 13, "Mixtures, Solutions, Chemical and Phase Equilibria," Editor, M. L. McGlasnan, Volume I—"Solid-liquid Equilibrium," R. Haase and H. Schonert, Institute of Physical Chemistry, Technishe Hochschule, Aachen, Germany 1969, translated by E. S. Halberstadt, Department of Chemistry, University of Reading; and this book is incorporated by reference into this patent disclosure.

With respect to applicant's graphical representations of the temperature-phase relationships employed, it first should be understood that it is not necessary to consider the gas component (e.g., $CO_2$ gas, $SO_2$ gas, etc.) of the herein disclosed solute/solvent solutions because such a gas component can come into and go out of these processes without "permanently" affecting their solute/solvent separation function. It also should be understood that applicant's process, like any other chemical mixing processes, is governed by certain phase-rule relationships for liquid solutions which are undergoing temperature/pressure changes. For example, Gibbs' phase rule applies to all of applicant's processes. Thus, application of Gibbs' phase rule would indicate that in a single component system, the degrees of freedom plus the number of equilibrium phases equal three, with the possible degrees of freedom being temperature and/or pressure. This rule also relates the number of phases (states) of a single chemical component which may exist in a stable equilibrium while in mutual contact. Consequently, over the gamut of pressures/temperature combinations at or above that limit commonly called the "critical temperature" this relationship implies that only one (gaseous) phase may exist when temperature and pressure are two degrees of freedom. Below the critical temperature, two phases—a liquid and a gaseous phase, may exist in equilibrium with either pressure or temperature free to vary, i.e., only one degree of freedom. Thus, to choose either is to fix the other at the boiling point defined by the vapor pressure vs. temperature relationship for the particular material involved.

Moreover, at a unique lower temperature/pressure pair known as the "triple point," three phases: solid, liquid and gas, may exist in equilibrium. However, neither pressure nor temperature is free to vary, e.g., for water, the triple point is precisely and uniquely at 0.01° C. and 4.579 mm Hg with zero degrees of freedom: if either temperature or pressure is varied, at least one phase disappears. The particular relationship of these interactions is complex; however, suffice it to say that a lowering of temperature while maintaining pressure will cause the liquid phase to disappear.

It also is important to an overall understanding of the herein described processes to realize that what is taking place in said processes is a phase transition, rather than a conventional "freezing", with the liquid converting to a "sublimed" vapor-solid equilibrium and the heat of fusion vanishing in the energy balance of the two remaining phases. This is evidenced by the fact that the three-phase separation effect employed in the herein disclosed processes is not gradual in time or in the amount of solid phase product (e.g., ice) produced. That is to say that, at applicant's "jumping off" low temperature of precooling, the desired three-phase separation effect will be immediate and is accomplished by production of copious amounts of a solid phase material such as ice.

The extension of this principle to multicomponent systems is also expressed (among other things) by Gibbs' phase rule. For simplicity in understanding its application to the herein disclosed processes, suffice it to say that for each system of known multicomponent composition, a distinct set of temperature/pressure values will prevail to produce the analogous phenomenon of quasi-critical boiling, freezing, and triple points. Moreover, since a system of "n" components (the fractions adding to 100%), is described by $(n-1)$ freely variable fractional quantities, each component over the first adds one compositional degree of freedom. Thus, Gibbs' phase rule, being compatible with the above single component rule, would dictate that the degree of freedom plus the phases equals the number of components plus two. The rule also might be expressed as follows:

[Degrees, Freedom (T&P)+Degrees (Comp)]+Phases=$(N_{comp}-1)+3$

Deg. Freedom+Phases=Comps+2

With these points in mind we now can turn our attention to FIG. 1 which graphs the behavior of a typical single species solute in a typical single species solvent. In effect, this graph depicts a temperature-phase relationship of solubility and melting point over a range of total compositional proportions extending well to either side of that particular solubility corresponding to the eutectic composition—solubility—at the minimum solution total freezing point. Those skilled in this art will appreciate that compositions of this type also must satisfy the governing thermodynamic phase-composition relationships typified by such a solubility (eutectic) diagram and that the phase equilibrium regions shown in FIG. 1 also can be related to the previously discussed Gibbs' phase rule" which, again, dictates that the number of freely variable conditions ("degrees of freedom") plus the number of phases must equal the number of components, plus two. Once more, the degrees of freedom can be temperature and/or pressure and/or compositional variables which amount to the number of components, minus one. The phases can be one gas phase, any number of liquid phases which are discrete (i.e., which do not dissolve in each other) and any number of solid phases so long as one does not constitute a continuous phase.

In FIG. 1, temperature is shown as the graph's ordinate. The weight percent of the solute in the total liquid solution is shown as its abscissa. Various regions on this graph are delineated by lines and pertain to phase-composition behavior typical of that region. For example, such regions can be depicted by two lines, an upper line formed by the intersection of two arcs (U-R and V-R) which are shown meeting at a sharp notch point R at $T_e$ and $C_e$, (the "eutectic" temperature and composition) and a lower horizontal line ($T_e$—$T_e$). The lower horizontal line ($T_e$—$T_e$) passes through point R and depicts a borderline for the complete range of compositions at $T_e$. It is, in effect, the ultimate total freezing point reached for any total beginning liquid composition. The notched curve URV also forms a lower borderline of initial precipitation of solids from the total liquid. Thus, region I represents a single phase liquid at all compositions.

Next, consider such a two component solution at point X, which represents a particular composition of solute at less than the eutectic composition. As the solution cools, its composition remains constant until it reaches its boundary arc line (U-R) as depicted by point D. There, pure solvent will begin to freeze, thereby precipitating pure solid solvent in the remaining liquid. The latter's composition, being solute-enriched by removal of solid solvent, follows the arc U-R in composition relating to the degree of cooling until it reaches $C_e$ and $T_e$, whereupon the whole mass freezes. Conversely, consider point Y at a composition richer in solute than it is at $C_e$. In an analogous manner, upon reaching its arc line (V-R), as depicted by point E, pure solid solute begins to precipitate, thereby leaving the solution progressively more dilute as the process follows the arc (V-R) relating composition through succeeding lower temperatures. This continues until the material reaches temperature $T_e$ whereupon the remaining liquid at the eutectic composition totally freezes to a solid.

Region I therefore depicts an entirely single phase liquid; region J depicts a liquid mixed with solid precipitated solvent; region K represents liquid mixed with solid precipitated solute; and region L represents total two-phase solid (except for a single solid phase at the unique situation of starting with single-phase liquid and ending with single-phase solid, but always at eutectic composition). In sub-region $L_A$, a continuous solid phase at $C_e$ contains inclusions of solid pure solvent while, on the other hand, sub-region $L_B$ contains a discontinuous phase of solid solute inclusions.

The teachings of FIG. 1 also should be understood to make no intrinsic difference in the behavior of either of the solution components. That is to say that there should not be construed, any functional distinction implied by the terms "solvent" and "solute." Simply stated: in a two component solution, either component of the starting material present, in excess of its eutectic concentration, will selectively separate as a solid phase with the remaining liquid phase increasing to eutectic concentration as the mass of the solution is cooled to its phase boundary curve (U-R) and thence to $T_e$ at $C_e$. Bearing this in mind, it will be appreciated that—depending on the conditions of concentration, temperature and pressure employed, the herein disclosed processes can be used to precipitate a solid phase product which is a solid form of the solvent (e.g., ice); or these processes can just as well be used to precipitate a solid phase product which is a solid form of the solute (a solid salt, e.g., magnesium carbonate) which precipitates from a saturated solution of the solvent as a result of applicant's Joule-Thompson free expansion of a single phase liquid solution which is properly prepared as to composition temperature and pressure to effect the precipitation of a solid solute product.

FIG. 2 presents another, more detailed, eutectic relationship for a solution of a non-volatile solute. That is to say that the principles discussed with respect to FIG. 1 are still in force, but they are depicted in FIG. 2 in a more particularized fashion by detailing certain appropriate heat-temperature-composition conditions for a free expansion to atmospheric pressure and a releasing of a dissolved gas. In discussing these more technical details, it should be noted that applicant's process does not readily lend itself to conventional physicochemical quantifying explanations. For example, the use of such quantifying techniques would seem to indicate that the cooling obtained by volatilizing a given amount of carbon dioxide gas would simply be insufficient to account for any but insignificant amounts of ice under normal freezing circumstances. Applicant has, however, found that as little as 3.5 volumes of $CO_2$ gas can be used per 1.0 volume of a 2–25% solute/solvent solution in order to freeze substantial portions of a solvent (e.g., water). The inconsistencies between certain possible quantifying explanations and the above-noted physical facts has led applicant to the belief that the herein disclosed processes are better explained by two basic principles: the basic phase relationships of single component thermodynamics, combined with the effects in chemical thermodynamics described in Gibbs' phase rule, and by the provision of additional compositional degrees of freedom encountered in multicomponent systems such as those employed in the processes of this patent disclosure.

In any event, we can begin a discussion of FIG. 2 by first noting that the raw material solution is depicted as having an initial composition $C_o$ and eutectic composition (solubility) of $C_e$ and eutectic temperature $T_e$. It also should be noted at this point that a large part of the practice of this invention involves selecting a temperature (such as a temperature $T_5$ as shown in FIG. 2) as the atmospheric freezing temperature of the solution concentrate. This temperature $T_5$ should just safely approach the eutectic composition (solubility), without freezing solute, as the final operating temperature $T_5$ to be employed in the practice of this invention.

FIG. 2 also is especially intended to depict what takes place when a quantity of starting material of initial composition $C_o$ is combined with a recycled quantity of a liquid phase product of the Joule-Thompson free expansion having a final composition $C_f$. This mixture, together with a dissolved gas-forming fluid X, is shown being cooled to a temperature $T_4$ at solute-solvent concentration $C_x$. Further cooling to lower temperatures may be accomplished by external refrigeration and/or, by heat exchange with cold effluent products of the process, or by injection of liquid carbon dioxide. Any combination or sequence of these cooling measures may be employed to reach intermediate temperatures $T_2$ and $T_3$ or jumping off temperature $T_4$.

A resulting composite solution is thus contrived to arrive at a finely adjusted temperature $T_4$, which approaches the three-phase "triple point" temperature $T_p$, of the pure solvent. Upon release of the process high state pressure to its low state pressure (nominally atmospheric), essentially all of the gas-forming fluid is vaporized carrying its heat of vaporization, Q obtained from the material remaining. A solution of concentration $C_x$ is thereby cooled first to point D, the initial freezing temperature $T_d$ which is lower than $T_p$. Therefore, as pure solvent begins to separate, it goes through a phase transition to pure solid-vapor phase equilibrium.

Most of the vapor thus released redissolves in the remaining liquid which increases in solute concentration as pure solvent is solidified out. This proceeds until the heat removal represented by Q has cooled the total mass through $\Delta T$ to temperature $T_5$, and solid solvent has separated to leave a liquid phase concentrated through $\Delta C$ from $C_x$ to $C_f$. Those skilled in this art also will appreciate that a final (i.e., lowest) volume of solution of a given composition can be readily calculated to satisfy an ultimate material balance of incoming vs. outgoing solute.

Thus, FIG. 2 graphically depicts what takes place when—in one particularly preferred embodiment of this invention (upon starting up the process)—all but a certain volume of final liquid is recycled back and combined with a portion of fresh feed (e.g., incoming fresh seawater) of an initial composition $C_o$, e.g., in the manner indicated at point 43 in FIG. 3 or in the manner indicated by the flow of concentrate recycle line 81 of FIG. 4. Consequently, as the process proceeds to steady operation, solute can accumulate in the "combined" (fresh seawater, plus recycled brine) feed until a net removal (commonly referred to as "blowdown") discards all new incoming solute. At that time the recycle composition and quantity becomes constant and, when added to fresh feed material (e.g., fresh seawater), achieves a combined feed of constant composition $C_x$. The recycled liquid, upon achieving the constant composition and quantity may be referred to as a constant recycle quantity of a concentrated liquid product. In any case, this combined feed will then be cooled (by means to be discussed below) to a "jumping off" temperature, e.g., temperature $T_4$ shown in FIGS. 1 and 2.

Meanwhile, some fluid material X (carbon dioxide liquid, carbon dioxide gas, sulfur dioxide gas, etc.), which is capable of going into a vapor state at the conditions prevailing after the Joule-Thompson free expansion, is introduced at a convenient point (or points) in the process at whatever state and in whatever quantity desired. For example, liquid or gaseous $CO_2$ may be introduced at one or more points in these processes (e.g., at points 21, 66 and 66' in FIG. 3). Preferably, some moderate starting excess of $CO_2$ will be employed initially. The final desired quantity can be estimated from the cooling effect of $CO_2$ at its point of introduction and state, and then as can be seen in FIG. 2, after an expansion which absorbs a sensible heat differences, Q, developed in following a cooling path from $T_4$ to $T_D$ (at point D, the initial freezing point of the solution of composition $C_X$) and thence to $T_5$ as the composition follows the freezing point curve to a value $C_f$ which represents the blowdown-recycle composition.

Moreover, as the steady-state operation condition is approached, the amount of gas-forming material (e.g., $CO_2$) being injected into the system can be trimmed to accommodate balance of water vaporization, gas residual losses, and process fluctuations. Consequently, various operating parameters such as: system high pressure, gas-forming material quantity and mode of material introduction can each constitute prime process control variables, together with the mode and strategy of any pre-cooling employed to reach the jumping off temperature. Conventional process instrumentation known to the art can be employed to control temperatures, pressures, flow rates, vessel liquid levels, etc. at any and all appropriate points.

Those skilled in this art also will appreciate that since the values of temperature/pressure prevail for each phase and its composition, as well as for the overall system, the energy and composition must adjust to migrations of components between phases in order to satisfy the particular phase relationship of each component in each phase and in order to obey both the laws of thermodynamics and Gibbs' phase rule. An example of this is exemplified by the well known rule to the effect that a melting point depression of 3.37° F. is caused by each gram-molecular weight of a covalent solute in a liter of aqueous solution. Thus, solid and liquid phases formed at an atmospheric melting point of a composite solution will occur at unusual pressure/temperature values vis-a-vis the phase behavior of each component.

Bearing these considerations in mind, applicant has created a process for separating a solute from a solute/solvent solution by use of a series of process steps which begin with an introduction of a gas and/or other gas-producing fluid material (e.g., a stream of liquid carbon dioxide released from a pressurized container of a liquid $CO_2$), which is capable of readily going into a gaseous state at those temperature and pressure conditions existing just after a hereinafter described single phase composite liquid undergoes a Joule-Thompson free expansion. In effect, such a gas or gas-forming material (e.g., liquid $CO_2$) is dissolved in such a solution. Again, for purposes of this patent disclosure, a material—be it a gas, a liquid, or even a solid—having this capability may be referred to as a "gas-forming fluid", "gas-forming material" or simply as a "fluid" or "fluid X" having this capability. Regardless of nomenclature, however, the introduction of such a gas-forming material into a given solution of this process (e.g., into a solute/solvent solution and/or into a single phase composite liquid) can be carefully adjusted as to quantity and temperature in order to aid in the creation of a final single phase composite liquid solution having the attributes needed to undergo a successful Joule-Thompson free expansion according to the teachings of this patent disclosure.

At this point, it also should be pointed out that in those versions of this invention wherein a gas (rather than a liquid) is originally introduced into the solute/solvent solution, a first heat exchange may be performed on the resulting solution in order to remove at least a portion of (and preferably most of, and most preferably all of) the heats of condensation and/or solution of the dissolved gas from the solution in which the gas is dissolved. On the other hand, if a gas-forming material is introduced into the solute/solvent solution as a liquid, then there is no heat of condensation to impart to the solute/solvent solution. Hence, in this case, there is no need to remove a heat of condensation from the system and hence no need for a first heat exchange step for the specific purpose of removing such a heat of condensation. Indeed, introduction of a gas-forming material in a liquid state, e.g., introduction of liquid carbon dioxide, will lower the temperature of the resulting gas-forming material owing to the fact that "heat" is taken away from the solute/solvent solution as a result of dissolving liquid $CO_2$ into said solution. Thus, the temperature of the resulting dissolved liquid $CO_2$/solute/solvent solution will be lower than the temperature of the incoming solute/solvent solution.

In some very special cases the introduction of sufficient quantities of a liquid, gas-forming material, such as liquid carbon dioxide, may even drive the temperature of the resulting $CO_2$/solute/solvent solution all the way to the jumping off temperature (hereinafter more fully described) which is needed to fully prepare said solution to successfully undergo applicant's Joule-Thompson free expansion step. In many, if not most cases, however, there will be a need to perform a cooling step on a solute/solvent solution after the gas-forming fluid is introduced into it. That is to say that this cooling step will generally be performed on the solute/solvent solution in order to remove sensible heat from said solute/solvent solution and thereby lower the temperature of the resulting solution (e.g., a resulting $CO_2$/solute/solvent solution-or a resulting single phase composite liquid material) to a certain "jumping off" temperature. In any case, the single phase composite liquid resulting from such conditions is then subjected to a Joule-Thompson free expansion in order to induce a three-phase separation and thereby form a solid phase product material, a liquid phase product material, and a vapor phase product material and thus provide a means whereby the solute component of the original solute/solvent solution can be separated from its solvent component.

As was previously noted, applicant's "controlled heating-cooling approach" taken by the herein disclosed processes will normally begin when a controlled quantity (portion, amount, etc.) of a source raw material solution (e.g., seawater, "hard", fresh water, industrial waste stream, etc.) is drawn into applicant's process system. In one particularly preferred embodiment of this invention, the raw material solution will be drawn from a source which is most preferably large enough (e.g., a body of seawater) to also serve, if need be, as a constant ambient temperature for the previously noted first heat exchange step if such a first heat exchange step is employed. That is to say that the source of raw material fluid (e.g., a body of seawater) may, if need be, serve as a system "heat sink", i.e., the source of raw material may serve as a point of heat disposal since such a body of water is so large that it will be unaffected in temperature when the heat of condensation of a gaseous fluid is discarded into it, e.g., in the manner suggested by item 14' in FIG. 3). That is to say that item 14' (like item 14) is intended to represent a body of starting material so large (e.g., the sea) that it serves as a "heat sink" as well as a source of raw material.

Again, in some of the more highly preferred embodiments of this invention, the liquid feed material will be mixed with a constant recycle quantity of a concentrated liquid product derived from the Joule-Thompson free expansion. Typically, this constant recycle quantity of the concentrated liquid product will have a temperature which is less than the temperature of the incoming feed solution. Thus, the temperature of the solution resulting from a mixing of these two solutions will be less than that of the feed solution. That is to say by mixing an incoming raw material solution with a controlled amount of a recycle liquid product of the Joule-Thompson free expansion (e.g., a mixing of the incoming feed 12 with a constant portion of recycled brine 44 taking place at point 43 in FIG. 3) a combined (composite, resulting, etc.) solution having both a lower temperature and a desired solute concentration can be obtained.

Again, dissolving an appropriate gas-forming fluid material (e.g., gaseous $CO_2$, liquid $CO_2$, etc.) into a liquid feed solution also will contribute to a change in the temperature of the feed solution into which the gas-forming fluid is dissolved. For example, dissolving a gas such as $CO_2$ gas into a brine solution will result in a net rise in temperature to a temperature $T_2$ for the resulting combined dissolved gas/solute/solvent solution due to absorption of the heat of condensation and/or solution of the gas which is dissolved into said solution. On the other hand, dissolving a liquid gas-forming material such as a pressurized $CO_2$ liquid will cause a resulting temperature $T_2$ of the liquid to be lower than the initial temperature $T_1$ of the incoming raw feed solution. In most cases, however, the temperature $T_2$ (be it higher or lower than $T_1$) resulting from dissolving the gas-forming fluid into a feed solution will have to be further adjusted downward in order to reach the desired jumping off temperature. As previously noted, in the case where a material in a gaseous state is dissolved into an incoming solution, the heat(s) of condensation and solution have to be removed from the system as a part of the overall cooling the solution will have to undergo in order to reach the jumping off temperature. Thus, a resulting $CO_2$/solute/solvent solution can be brought to a first lower temperature by cooling in a first, distinct, heat exchange means. Again, such a first heat exchange could be an external heat sink such as, for example, a body of seawater as indicated by item 14' of FIG. 3. That is to say that for economic reasons, if the injected gas-forming fluid is in a gaseous state, the resulting gas-forming fluid/solute/solvent solution can be cooled down by heat exchange against a body of water such as the source of the water, rather cooled by means of mechanically produced refrigeration or by use of the cold products of the Joule-Thompson free expansion. Suffice it to say, however, that regardless of the method of cooling employed, the resulting solution should lose a substantial portion of the heat of condensation of a gas-forming material introduced into the process in a gaseous state, but not at the expense of a subsequent cooling effect produced by the Joule-Thompson free expansion.

This first cooling step also can be carried out by some other source of cooling (e.g., by heat exchange against the products of the Joule-Thompson free expansion, by cooling against outside sources of cooling and/or refrigeration, etc.). Indeed, any number of cooling steps or stages to successive lower temperatures $T_3$ and eventually to a jumping off temperature $T_4$ can be augmented or replaced by mechanically produced refrigeration, but to the extent such mechanical refrigeration from outside sources is employed, the economic advantages of this process are diminished.

After this first heat exchange is made against a "heat sink" and/or against another source of cooling or refrigeration, a second heat exchange (which is preferably, mostly or even totally, made against a source of low temperature other than the heat sink of the first heat exchange means (if such a first heat exchange means is in fact employed). Such a heat exchange will normally be performed upon the solution which results from dissolving the gas-forming material in a solute/solvent solution. Obviously the "first" and "second" heat removal steps can be combined into a single heat removal step through the use of an outside source of refrigeration, heat exchange against one or more products of the Joule-Thompson free expansion, etc. In any case, for the purposes of this patent disclosure the solution resulting from such any mixing and/or temperature lowering steps will generally be referred to in terms such as "single phase liquid," "single phase liquid solution," "single phase composite liquid," "single phase liquid composite solution", etc.), especially in the case where such a resulting solution is brought to a certain lower temperature which is often designated herein as the "jumping off" temperature.

At this point, it also should be noted that the subscripts associated with the various temperatures, (e.g., $T_2$, $T_3$, $T_4$ and $T_5$) will not mean the same thing for all embodiments of this invention. For example, if there is no distinct first heat exchange for the purpose of discarding an injected vapor's heat of condensation, the "jumping off" temperature might logically be thought of as the third point of interest with respect to temperature and hence be designated "$T_3$". On the other hand if there is a distinct first heat exchange in order to throw away the heat of condensation of an injected vapor (e.g., at the heat sink designated by 14' in FIG. 3), then the jumping off temperature might logically be designated as "$T_4$" in tracing that sequence of "temperature events." In the same vein, if the introduction of sufficient quantities of liquid carbon dioxide into a solute/solvent starting material were to drive the resulting solution's temperature all the way to its "jumping off" temperature, this jumping off temperature could be designated as "$T_2$". Thus, it should be understood that the temperature designations $T_2$, $T_3$, $T_4$, and $T_5$ are intended only as aids in explaining what takes place in a particular embodiment of this invention and should not be interpreted to mean that a given temperature designation means the same point or condition in a different embodiment of this invention.

In effect, applicant's Joule-Thompson free expansion step constitutes an irreversible adiabatic expansion of the single phase composite liquid which results from adjusting the temperature, pressure, and concentration attributes of a given gas-forming material/solute/solvent solution. This process step must, however, be carried out at a temperature which is carefully contrived to permit an adiabatic expansion from a nominal high pressure to a nominal low pressure in order to produce a system low temperature which just approaches—for example, note once more the location of point $Q(T_5)$ in FIG. 1—the eutectic temperature $T_e$ of the single-phase liquid solution. Thus, the Joule-Thompson free expansion, with its consequent release of the gas dissolved in the single phase liquid solution, will suffice to lower the temperature of the single phase liquid to approach its eutectic temperature.

As was previously noted, in some particularly preferred embodiments of this invention, a final approach to the jumping off temperature can be made by introducing a stream of a liquid gas-forming material such as liquid $CO_2$ into the single phase liquid just before it undergoes the Joule-Thompson expansion. This is preferably done just after the solute/solvent solution is "boot-strap" heat-exchanged (e.g., incoming "warm" single phase liquid is heat exchanged against an outgoing "cold" stream) against one or more of the cold effluent products produced by the Joule-Thompson free expansion since these products will each have temperatures which approach the eutectic temperature $T_e$. Again, to the extent that such a boot-strap heat exchange does not bring an incoming portion of a single phase liquid to a desired jumping off temperature, a liquid form of a gas-forming material (e.g., liquid $CO_2$ liquid $SO_2$, etc.) may be injected to help the single phase liquid achieve a desired jumping off temperature.

However, the realities of the thermodynamics and the economics associated with these processes do force several "restrictions" which must be obeyed in order to successfully carry out the herein disclosed processes. These restrictions include the fact that a gas phase, a liquid phase, and a solid phase each must result from the irreversible adiabatic expansion (i.e., the Joule-Thompson free expansion). For example, the production of only two phases will not constitute a successful outcome for the herein described processes. This requirement for the production of three phases necessarily relates a certain temperature and a certain pressure for a "triple-point" which is thus completely determined when all compositional options implicit in Gibbs' phase rule (i.e., the degrees of freedom plus the number of phases must equal the number of components plus two) have been used up. In other words, in applicant's process, there are no degrees of freedom remaining downstream of the irreversible adiabatic expansion. However, at the upstream end of applicant's Joule-Thompson free expansion there are two degrees of freedom, since applicant's process "contrives" (e.g., by temperature adjustment) to have only a single phase liquid present at the jumping off point in the process. In other words, since the pressure is set (e.g., at the system's nominal high pressure) and the composition of the materials employed is likewise set, and since the gas quantity will be set to a given level by the adiabatic energy balance requirements, there can be only one degree of freedom remaining, namely, the temperature of the single phase liquid solution entering the irreversible adiabatic expansion. Again, for the purposes of this patent disclosure, this temperature is often referred to as the "jumping off" or "brink" temperature.

Stated in another way, there is a "brink" temperature or temperature "jumping off point" (depicted by $T_4$ in FIG. 2, or by $T_3$ in discussions of those examples of these processes where liquid $CO_2$ is injected into a solution stream of this process) which, among other things, must obey the fundamental restriction that, ideally, no heat is to enter or leave the chamber in which the Joule-Thompson expansion is carried out. This restriction forces a situation in which a single phase composite liquid must necessarily exist under a precisely paired set of temperatures and pressures. That is to say that the "brink" temperature is that temperature of the single phase composite liquid such that a release of pressure from a nominal high pressure associated with a nominal high state of the process to a nominal low pressure associated with a nominal low state of the process results in evolution of essentially all of the gas originally dissolved in the incoming solute/solvent solution (or all of the gas-forming material, e.g., all of the liquid $CO_2$) will vaporize and upon such vaporization, will absorb its heat of condensation in that quantity of heat which is required to lower the temperature of an entire mass of the single phase liquid to approach the eutectic temperature $T_e$ of said single phase liquid. Those skilled in this art will appreciate that not only can such a brink temperature be precisely controlled, it also can be calculated and/or determined by various testing procedures known to the process engineering arts.

Thus, in those embodiments of this invention concerned with production of solid phase solvent (e.g., ice), once both a nominal high pressure and a nominal low pressure have been set and once the three-phase "goal" temperature has been made near the eutectic temperature by composition preadjustment, only the brink or jumping off temperature such as temperature $T_4$ depicted in FIG. 1 can be varied so that—upon the occurrence of the Joule-Thompson free expansion—all prescribed conditions will be met, namely: (1) the evolution of substantially all of the dissolved gas (e.g., carbon dioxide) will take place, (2) the precipitation of all surplus solvent (e.g., in the form of ice) in the single phase liquid, over and above the desired approach to the eutectic composition, will occur, (3) a liquid phase product of increased solute concentration (e.g., brine) will be produced and (4) the energy in the Joule-Thompson free expansion will be the same going in as it is going out. When these conditions are satisfied, the solid precipitated material (e.g., ice) will represent "pure" surplus solvent; hence a "pure product" such as potable water can be obtained from an aqueous solute/solvent solution such as seawater.

From an energy standpoint, in order to satisfy the particular and overall energy composition and phase relationships involved with the herein disclosed processes employing freezing at atmospheric pressure below the triple point of water, all non-volatile solute migrates to a concentrated residual liquid solution of lower freezing point. The solid phase remaining is pure solvent below its triple point. The gas phase consists in this case of all the gas-forming materially originally dissolved in a starting material (e.g., carbon dioxide), beyond trace solubility of the gas in the liquid and any minor amounts of solvent vapor (e.g., water vapor) which may be included in the vapor phase product. Under such conditions, the nominal low pressure is too low for the $CO_2$ triple point to permit the existence of a liquid; and concomitantly, the temperature is too high to permit the existence of solid "dry ice." However, a freezing of water to ice does result in some sublimation to steam, which is thereupon perforce divided between the liquid and gas phases to satisfy energy balance requirements.

Again, it should be emphasized that, ideally, the Joule-Thompson free expansion is most preferably completed at a point which lies just above the point represented by the eutectic concentration/eutectic temperature point $C_eT_e$; e.g., in FIG. 1 this point is shown as point $Q(T_5)$ (which corresponds to point $C_f(T_5)$ in FIG. 2), which lies just above point R. In other words, immediately after the Joule-Thompson free expansion is completed, the concentration/temperature phase relationship should lie at a point ($Q(T_5)$ of FIG. 1 or $C_f(T_5)$ of FIG. 2), which is "contrived" to be just above a point (e.g., point R in FIG. 1) which represents the eutectic concentration and temperature $C_eT_e$. The Joule- Thompson free expansion should not, however, be allowed to bring the lowest temperature so produced to some lower point below line $T_e$—$T_e$, such as point S of FIG. 1 for example, since this would cause the formation of a completely frozen total product. This requirement also will set the amount of gas-forming fluid X (e.g., carbon dioxide) to be dissolved in a solution stream of this process (e.g., in an incoming raw material stream or in a subsequently produced composite stream). That is to say that this amount of fluid X also can be a "contrivance" which can be employed to cause the Joule-Thompson expansion to stop at point $Q(T_5)$ rather than go onto an undesired lower level such as point S.

As was previously noted, the herein disclosed processes, for reasons of economics and convenience, most preferably are employed at relatively "low" nominal high pressures (e.g., the pressure of the single phase composite liquid at the exit point 22 of eductor 20 as shown in FIG. 3) which are most preferably in a range from only about 2 to about 20 atmospheres. However, the pressure in the chamber in which the Joule-Thompson expansion is carried out (the system's nominal low pressure) is most preferably set at approximately atmospheric pressure (for reasons of process economics and convenience, if nothing else). However, it also should be at least mentioned in passing that the expression "atmospheric pressure" should not be taken literally. That is to say that applicant's invention also contemplates cases wherein the products formed by the Joule-Thompson free expansion are not injected into the "atmosphere" of a product collection vessel (such as vessel or chamber 38 of FIG. 3), but rather are injected into a liquid (e.g., brine) contained in such a product collection vessel. In such cases, the nominal low pressure is not quite "atmospheric pressure," but rather the pressure of the liquid at the point of injection of the Joule-Thompson free expansion products into the collection vessel or chamber. In most cases, however, there will be little difference between these two pressures. For example, the injection may be carried out to a point just a few inches below the surface of, say, a brine liquid phase product of the Joule-Thompson free expansion. Any ice formed by this mode of performing the Joule-Thompson free expansion will of course float to the surface of the brine from whence it may be collected by any number of skimming or overflow techniques known to the chemical process arts. In this case, the vapor will of course pass through the brine and then go into the "atmosphere" existing above the surface of the brine in the vessel.

At this point, it might again be strongly emphasized that the "fate" of the vapor (e.g., $CO_2$ vapor) which is evolved from the Joule-Thompson free expansion can be of considerable importance to the overall economics of the herein disclosed processes. That is to say the vapor could be allowed to simply escape from the system. In other words, the process could operate by constantly supplying new $CO_2$ from an outside source such as "bottled", liquid $CO_2$. This, however, constitutes an economic waste since the $CO_2$ can be reused in its vapor form or recompressed to a liquid form at a cost which is normally less than the cost of a new supply of bottled carbon dioxide liquid. Consequently, most of the more preferred embodiments of this process also will involve reusing the $CO_2$ vapor produced by the Joule-Thompson free expansion.

Again, such a vapor simply could be sent directly back to an earlier stage of the overall process and be reintroduced into the solute/solvent solution (or into a single phase composite liquid prepared from the solute/solvent solution) as a vapor. As shown in FIG. 3, this could easily be done through the use of a jet eductor such as the jet eductor 20 shown in FIG. 3. As previously discussed, this mode of injection implies that the heat of condensation/solution of the gaseous $CO_2$ (or any other gas, such as $SO_2$, so employed) would have to be removed from the solution into which it is dissolved. This heat removal step could be accomplished through a separate heat exchange with any low temperature source. It could, for example, simply be supplied from an external source of refrigeration; but again for reasons of economics, if nothing else, at least a part of the heat of condensation resulting from dissolving a gas into a liquid is most preferably removed by heat exchanging the solution against a heat sink such as a large body of seawater or against one or more cold product streams of the Joule-Thompson expansion. For example, FIG. 3 shows how a heat exchange means 28 can be supplied with refrigeration by heat exchanging product streams 40, 42, and/or 44 produced by the Joule-Thompson free expansion against an incoming liquid stream 24 (e.g., a single phase liquid stream) as it moves toward the Joule-Thompson free expansion step of the overall process.

However, in one particularly preferred embodiment of this invention, a vapor phase product stream such as $CO_2$ vapor will be mechanically recompressed (by compressor means well known to the process engineering arts) to a liquid (e.g., liquid $CO_2$) and placed under pressure for subsequent reuse in this process. Such reuse may be by direct reintroduction of the liquid into the process; or the liquid $CO_2$ produced by such a compressor could be stored in a pressure vessel (e.g., a steel "bottle" of liquid $CO_2$) for future use. For example, FIG. 3 depicts how a vapor product stream 40—by means of an appropriate use of valves 58 and 59—could be sent to a mechanical compressor 60 and converted to a liquid product stream 62 (e.g., liquid $CO_2$) rather than being sent as a vapor to the inlet 21 of jet eductor 20. That is to say that a liquid stream 62 of $CO_2$ can be sent directly back to an earlier stage of the process (e.g., to point 66 in FIG. 3) or it can be stored in a pressure vessel 64 for subsequent use in the herein disclosed processes. Counterpart items 58', 59', 60', 62', etc. show how such a vapor stream can be recompressed to a liquid and sent directly back to some other point in the process (e.g., sent to point 66'), which is more proximate to the Joule-Thompson free expansion device. Obviously both liquid forms and gaseous forms of the gas-forming material (e.g., liquid $CO_2$ and $CO_2$ vapor) can be injected into the process at different points of introduction (or, for that matter, at the same point of introduction). Again, such injection of liquid $CO_2$ at some point in the process "upstream" from the point where the Joule-Thompson free expansion is carried out (e.g., point 66' in FIG. 3) may be employed to achieve a desired jumping off temperature which is necessary to the successful operation of applicant's processes.

The remainder of the herein disclosed processes deal mostly with the practical aspects of machinery and utilities requirements. They are mostly concerned with providing the cooling required to bring a given single phase composite liquid to an appropriate "brink" temperature. For example, it should be understood that conventional heat exchange equipment, most preferably arranged in a series configuration, e.g., in "stages" or "steps" employing the three effluent streams, each carrying product streams at the triple point temperature (and distributed in a manner which is suited to the application and features to be favored or emphasized in some particular embodiment of these processes), can be used in varied ways in helping a given solution become a single phase composite fluid which is poised at its jumping off temperature. For example, the distribution of the respective vapor, liquid and solid phase products of the Joule-Thompson free expansion can be provided with a designed flexibility to accommodate varied process requirements such as the previously noted "adjustments" in solute concentration in the incoming feed stream (e.g., which can be increased by the interjection of recycled brine into the incoming seawater). That is to say that various valving and manifold systems known to the art can be used to direct each of the three material streams produced by the Joule-Thompson free expansion back to various points throughout the overall system. Valving manifolds, heat sensing devices, pressure sensing devices, pump systems and/or computer operated control systems well known to the art can be employed for such control purpose.

DESCRIPTION OF THE DRAWINGS

FIG. 4 represents a preparation section and FIG. 5 represents a process section of a particularly preferred embodiment of this invention.

DESCRIPTION OF THE PREFERRED EMBODIMENTS

Figure 1:
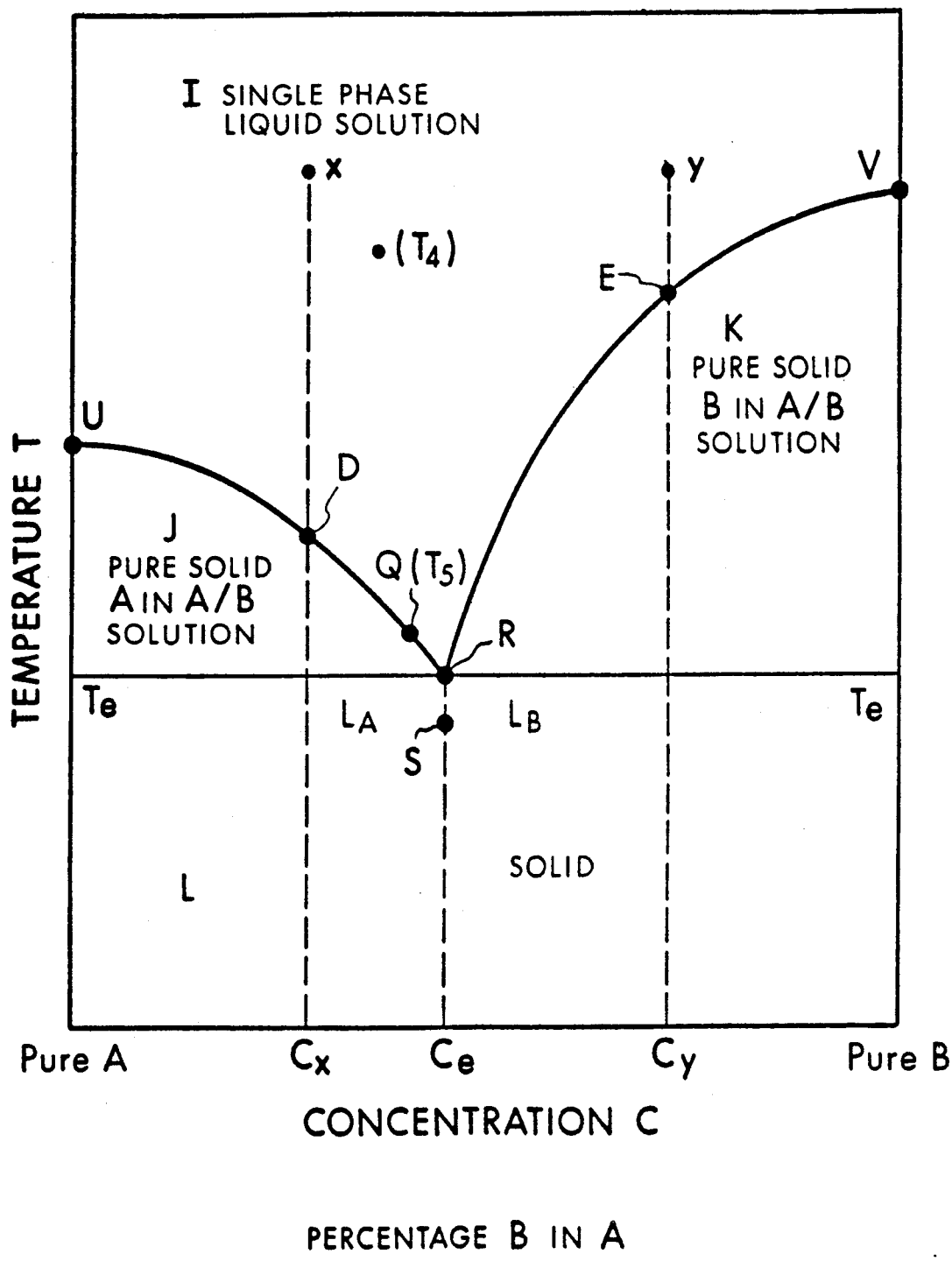
FIG. 1 depicts a temperature-phase relationship diagram of a single solute, single solvent system. It particularly illustrates certain key operating conditions which occur during the Joule-Thompson free expansion step of the herein disclosed process.
Figure 2:
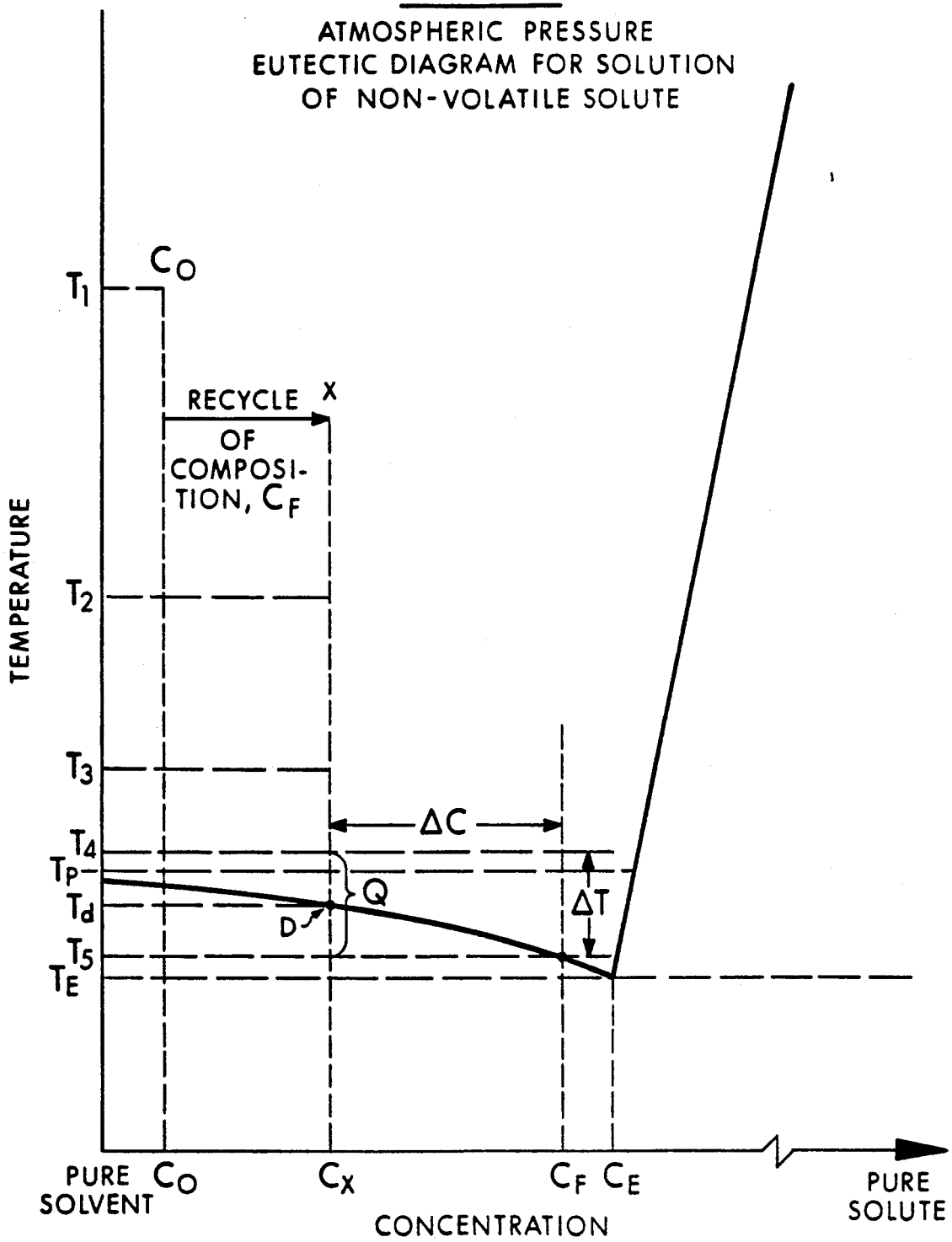
FIG. 2 depicts a temperature-phase relationship diagram of the type shown in FIG. 1, but which is detailed to illustrate the manner in which a solute/solvent solution approaches its eutectic composition as the temperature is lowered.

As was previously discussed, FIGS. 1 and 2 depict temperature-concentration phase diagrams for simple solute/solvent solution systems. These two figures were discussed in the "Summary Of The Invention" portion of this patent disclosure and, thus, require no further comment.

Figure 3:
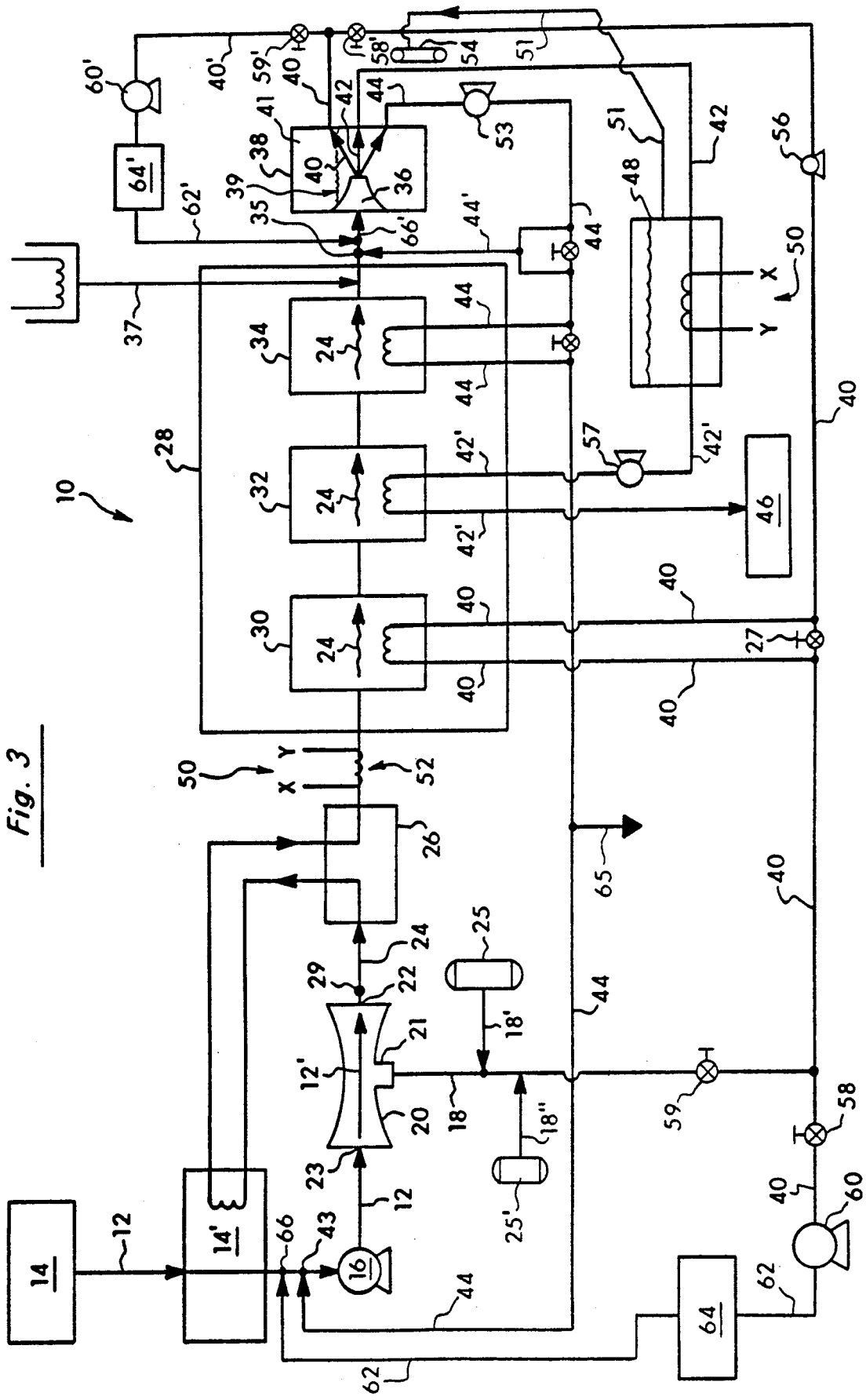
FIG. 3 depicts a process flow scheme for some representative embodiments of the herein disclosed processes, especially those wherein certain products resulting from the Joule-Thompson free expansion are used as heat exchange media in heat exchangers employed to carry out said processes.

FIG. 3 is a flow diagram of several particularly preferred embodiments (and alternative embodiments) of an overall processes 10 which can be used to carry out this invention. All of these embodiments begin by obtaining a solute/solvent solution starting material 12 which has an initial solute (e.g., a salt) concentration in a solvent (e.g., water) and an initial temperature $T_1$. The starting material can be obtained from any suitable source 14 (e.g., a body of seawater, a body of other water or a stream of an industrial waste fluid source having one or more solutes in a liquid solvent, etc.) which is comprised of said solute/solvent solution. A pump 16 can be readily employed to obtain the solute/solvent solution and to place it under pressure. In one important embodiment of this process, a solute/solvent solution 12 is mixed, preferably while it is under pressure (for example, under the pressure supplied by pump 16), with a partially soluble gas 18 (e.g., $CO_2$ gas) in order to dissolve said partially soluble gas 18 in the solute/solvent solution 12 and in order to produce a single phase composite liquid material 24.

A most preferred method of dissolving the partially soluble gas 18 into the solute/solvent solution starting material 12, under a relatively high pressure (e.g., 20 to 300 psi), is through the use of a jet eductor 20 wherein the solute/solvent solution 12, under the pressure supplied by pump 16, is driven through the jet eductor 20 as a motive fluid 12' in order to educt the partially soluble gas 18 (e.g., carbon dioxide), which enters the eductor 20 via the inlet port 21 of said jet eductor 20, into the motive fluid 12' and thereby dissolving said gas 18 into said solute/solvent solution 12. This dissolving of the gas 18 into the solute/solvent solution 12, be it through the action of jet eductor 20 or by other means for dissolving a gas into a liquid under pressure (not shown in FIG. 1), will cause the gas 18 to give up its heat of condensation and thereby raise the temperature of the resulting dissolved gas/solute/solvent solution 24 (which has been, and will be, referred to as a single phase composite liquid material 24 for the purposes of this patent disclosure) to some temperature $T_2$ which is higher than the temperature $T_1$ of the incoming solute/solvent solution 12 starting material.

At this point, it also should be noted in passing that the mechanical inefficiency of jet eductors of this type will cause the pressure of the motive fluid 12' leaving the jet eductor 20 to be considerably less than the pressure placed on the motive fluid 12' by the pump 16 as said motive fluid 12' just enters the jet eductor 20. Pressure losses of 20 percent to as high as 95 percent will not be uncommon in such jet eductors, depending on various operating parameters such as the pressure supplied by the pump or pumps employed, the temperature of the solute/solvent solution, the temperature of the gas educted, the volume of solute/solvent solution, the volume of gas educted, the chemical nature of the various fluids, the temperature at which the jet eductor itself is operated, etc. This being the case, the term "nominal" high pressure, for the purposes of this patent disclosure, should be regarded as the pressure at the flow exit end 22 of the jet eductor 20, rather than the pressure supplied by the pump 16 at the flow entrance end 23 of said jet eductor 20. Thus, it is the pressure at the flow exit end 22 which should be from about 2 to about 20 atmospheres.

In any case, the resultant liquid product of dissolving the partially soluble gas 18 into the solute/solvent solution 12 most preferably should be a "single phase composite liquid" 24. That is to say that this single phase composite liquid 24 should be a liquid material having no undissolved solid phase material and no undissolved gas phase material mixed in with said single phase composite liquid 24. In other words, the liquid exiting the jet eductor 20 should be essentially a single liquid phase even though the liquid contains solute(s) and gases dissolved into said liquid.

In order to meet the requirement that the liquid exiting the jet eductor 20 be a single phase composite liquid, there will exist an upper limit of temperature $T_{max}$, given the amounts and temperatures of the materials (motive fluid 12' and educted gas 18) entering the jet eductor 20, at their respective quantities and temperatures, above which the jet eduction action should not be employed. That is to say that if this temperature $T_{max}$ is exceeded the fluid exiting the eductor 20 will not be a single phase composite liquid, but rather will be a mixture of a liquid phase material and a gas phase material. This condition is undesirable and should be avoided to the fullest extent possible. Therefore it is necessary that such an upper temperature limit $T_{max}$ be determined by calculation or test results. In other words, below this upper limit temperature $T_{max}$, only a single liquid phase will exit the eductor 20 and this is to be sought to the fullest extent possible. To this end sensor device(s) 29 can be positioned near the exit end 22 of said eductor 20 to insure that this operating condition is obtained and maintained. However, it also should be noted that for all practical purposes, the closer the jet eductor 20 is operated to this upper temperature limit $T_{max}$, the more favorable the overall economics of the process will become. Transgression of this upper temperature limit can be avoided by adjusting the temperatures of the fluids coming to jet eductor 20 by heat exchanging them, partially heat exchanging them and/or not heat exchanging them against the single phase composite liquid or against some other source of "heat" or source of "cold".

Those skilled in this art will of course appreciate that within these restrictions, known performances of commercially available eductors, for the inlet conditions of quantities, temperatures and pressures of motive and educted fluid, can be obtained from the eductor manufacturer, or can be readily calculated. In either case, however, once obtained, this information then can be used to predict the outlet temperature and pressure of a given single phase composite liquid material such as seawater into which the partially soluble gas, e.g., carbon dioxide has been dissolved. Temperature sensor devices 29 can be employed to great advantage to assure that the operating temperature of the jet eductor 20 is such that only a single phase composite liquid leaves said eductor 20. Moreover, and more to the point of the herein disclosed process, some desired temperature and pressure of a given single phase composite liquid can be used as a "design" basis or criterion for selection of the most appropriate eduction equipment in view of the values of the temperatures, pressures and quantities of the fluid materials fed into the eductor as the motive fluid 12' and as the educted fluid (i.e., the gas 18). That is to say that good "design" can serve to minimize the need to "adjust" the eductor's operating temperature.

Be that as it may, the next step in the overall process 10 may be to introduce the single phase composite liquid material 24 having a temperature $T_2$ into a first heat exchange means 26 in order to remove a quantity of heat from said single phase composite liquid material 24 which most preferable approximates the quantity of heat represented by the heat of condensation of the gas 18 which was given up to the single phase composite liquid material 24 in dissolving therein and whose loss will bring said single phase composite liquid material 24 back to some third temperature $T_3$, which most preferably, approximates the initial temperature $T_1$ of the original solute/solvent starting material 12. Again, this heat exchange is most preferably (but not necessarily) carried out against a portion 14' of the "source" solute/solvent solution (e.g., carrying out this heat exchange against a large body of seawater) which, in effect, acts as a "heat sink" for the heat of condensation of the gas 18; however, this first heat exchange, most preferably, should not be carried against the products of the Joule-Thompson free expansion. This heat exchange can of course also be carried against a source mechanically produced refrigeration—not shown in FIG. 3. Thus by heat exchange against, say, a heat sink, or against a source of mechanically produced refrigeration, the temperature $T_3$ of the single phase composite liquid material 24 can be readily made to approximate the temperature $T_1$ of the solute/solvent solution 12 starting material (e.g., seawater, at its ambient temperature $T_1$).

Once this first temperature exchange is accomplished, the single phase composite liquid material 24, at a nominal system high pressure and temperature $T_3$, is then introduced into a second heat exchange means 28 wherein a second heat exchange is performed upon the single phase composite liquid material 24. Again, this second heat exchange means most preferably, should employ a source of cold completely distinct from the source of cold employed by the first heat exchange means. For example, the heat exchange could be carried out by means of a source of mechanical refrigeration completely external to this process as indicated by the external source of refrigeration 37 shown in FIG. 3. Again, however, use of so-called "bootstrap" heat exchanges against one or more products of the Joule-Thompson free expansion—for reason of economics and efficiency—are the more preferred means of bringing the single phase composite liquid to brink temperature $T_4$. Most preferably, such a bootstrap second heat exchange means 28 will be comprised of a series of heat exchange zones such as a first heat exchange zone 30, a second heat exchange zone 32, and a third heat exchange zone 34, etc. such as those generally depicted in FIG. 3. This all goes to say that extraneous sources of cold, e.g., those provided by mechanical refrigeration equipment can be employed, but to the extent this is done, the economic efficiency of the system is decreased. In any event, by this means, the single phase composite liquid material 24 can be progressively chilled as it passes through a series of such heat exchange zones until said single phase composite liquid material 24 eventually reaches a "brink" temperature $T_4$ which is such that a release of pressure on the single phase composite liquid 24 from a nominal high pressure to a nominal low pressure results in the evolution of substantially all of the dissolved gas which, upon vaporization, absorbs heat of condensation in a quantity which is required to lower the temperature of an entire mass of the single phase composite liquid to a temperature $T_5$ which approximates the triple point temperature $T_e$ of said single phase composite liquid. Again, attainment of temperature $T_4$ may be aided by the use of external sources of refrigeration 37, but the use of such external sources of refrigeration are to be minimized or avoided if possible because they represent added expense. Moreover, as attainment of temperature may also be aided by introduction of a liquid (e.g., liquid $CO_2$) which, just before the Joule-Thompson free expansion, lowers the temperature of the single phase composite liquid by virtue of the $CO_2$ absorbing heat of vaporization from the solute/solvent solution.

Again, those skilled in this art will appreciate that a Joule-Thompson free expansion constitutes an irreversible, adiabatic expansion, from the system's nominal high pressure (e.g., 2-20 atmospheres) to its nominal lower pressure (which most preferably, but not necessarily, approximates atmospheric pressure) of the single phase composite liquid material 24 and that such an expansion is most preferably carried by use of a nozzle 36 which sprays into a chamber 38, and in this case into a chamber 38 most preferably having a pressure of about one atmosphere. Temperature sensor means can be placed at a point 35 which is located between the heat exchange means 28 and the nozzle 36 to monitor the brink temperature $T_4$ and/or to effect adjustments of said temperature $T_4$ by changing heat exchange paths, material quantities, temperatures, etc. In one preferred embodiment of this invention the nozzle 36 sprays into a chamber 38 which contains the liquid phase product of the Joule-Thompson free expansion (e.g., brine) at a point which lies below the surface 39 of the liquid (brine). Thus, upon being created by the three phase separation, at a point below the surface of the liquid; the ice will float to the surface 39 from whence it can be mechanically collected. The $CO_2$ vapor phase product of the expansion will ascend through the brine and escape into the chamber's "atmosphere" 41. Obviously, when this procedure is employed the "nominal low pressure" of the system is not exactly atmospheric pressure, but rather the pressure of the liquid at the distance below its surface 39 at which the nozzle 36 is located.

In any case, if the various operating conditions of the process have been properly set and adjusted, the Joule-Thompson free expansion of the single phase composite liquid material 24 through nozzle 36 will lower the temperature of said single phase composite liquid material 24 to a temperature $T_5$ near its triple point $T_e$ and thereby produce three distinct phases of cold material. The first phase 40 will be essentially a pure vapor (e.g., carbon dioxide vapor with only minor amounts of water vapor). The second phase 42 will be essentially a pure, solid solvent (e.g., ice) or pure solid solute (e.g., magnesium carbonate, sodium chloride, etc.)—but not both— —and the third phase will be a liquid 44 (e.g., brine) whose solute concentration can be made to be more than (or under proper initial mixing conditions, less than) that of the solute/solvent solution starting material 12. As dictated by material and energy conservation, the solution of remaining solvent and solute (e.g., brine) can be made to be a liquid 44 which approaches the saturation (eutectic) composition at the triple point temperature $T_e$ of the given material. Such liquids are especially useful as recycle fluids which are mixed with incoming raw material solutions in order to raise the solute concentration of the solution resulting from such mixing.

It again should be noted that a portion of such a liquid 44 (e.g., brine) can be recycled back to some initial stage of this process (e.g., to point 43 or to point 21) for recombination with a stream of feed material, e.g., it can be mixed with a new portion of the incoming stream of solute/solvent solution 12 (at point 43) or with the single phase composite liquid 24 at some other convenient point before it undergoes the Joule-Thompson free expansion. As was previously noted, this recycling can serve to provide a compositional flexibility to enable an approach to saturation as a process adjustment technique. Again, to this end, FIG. 3 depicts how at least a portion of a stream of the liquid 44 (the liquid phase product of the Joule-Thompson free expansion, e.g., brine) can be sent directly back to be mixed, at point 43 for example, with an incoming stream of fresh solute/solvent solution 12. As indicated by the presence of discharge arrow 65, the liquid stream 44 can be apportioned into two streams, a recycle portion, which is reintroduced into the process at point 43, and a remainder portion which is removed from the system 10. The removal of this remainder portion could, for example, be carried out by a "blowdown" procedure of the type previously discussed. Indeed, in many instances a blowdown procedure will be the most preferred technique for recycling the liquid phase material 44 back to an earlier stage of this process.

In this particular embodiment of this process, the stream of liquid 44 can also be heat exchanged against the single phase liquid composite material 24 in zone 34 of heat exchange means 28. That is to say that since liquid of stream 44 will have a temperature $T_5$ which is lower than that of the temperature of the single phase composite liquid material 24 flowing through heat exchanger 28, the two streams can be heat exchanged against each other. Ideally the heat exchange in zone 34 should produce a temperature in the single phase composite liquid material 24 which constitutes the "brink" temperature $T_4$ previously discussed. To the extent this cannot be achieved, however, external sources of cold 37 can be employed and/or liquid gas 62' (e.g., liquid $CO_2$) can be introduced in order to achieve the desired jumping off temperature $T_4$.

FIG. 3 also is intended to indicate that there will also be other vessels (e.g., 46, 48, etc.), heat exchanger zones (e.g., zone 50), pumps (e.g., 53 and 57) employed in order to use the material of these three phases to some of, or all of, the extent of the available refrigeration they are capable of providing. The nature and relative importance of the refrigeration capabilities of the materials which comprise the three phases produced by the Joule-Thompson free expansion will include various considerations. First, it should be emphasized that the temperatures of the recycle gas (e.g., carbon dioxide) can be adjusted to encourage production of a single phase composite liquid material 24 in eductor 20. For example, one such temperature "adjustment" can be accomplished by heat exchanging the gas 40 against the single phase composite liquid material 24 (e.g., in zone 30 of heat exchanger 28) before it is re-educted into a gas inlet port 21 of eductor 20. However, as depicted by the presence of valve means 27, the gas 40 also can be sent directly back to the inlet nozzle 21 of eductor 20 without being heat exchanged against the single phase composite liquid 24 in zone 30 (or in any other zone 32 or zone 34, etc.). It should also be noted that a stream of gas 40 obtained from the Joule-Thompson free expansion can be augmented by gas 18' (or liquified gas 18") from a make-up source 25 of such gas (or a make-up source 25' of such liquified gas). Indeed the use of such make up case will be the usual case.

FIG. 3 also depicts how some or all of the solid phase material 42 can be sent, e.g., by conveyor means 54, to a melting vessel 48 wherein all solvent water is maintained as a two-in-one solid/liquid mixture 45 from which a liquid solvent (e.g., water) 42' can be obtained. Moreover, one or more true counter-flow heat exchangers (e.g., 30, 32, 34, etc.) can employ a stream of such liquid solvent 42'. A stream 51 of fresh water can be obtained from the melting of a solid phase, solvent product such as ice in vessel 48 in which ice and water are mixed and maintained and then used to wash surface brine from newly formed ice. It also should be noted that the ice/water mixture in vessel 48 can be used in a heat exchange means 50 which is depicted by coil X-Y in vessel 48, and exchanged against the single phase composite liquid 24 at a point 52 located between the first heat exchanger 26 and the second heat exchanger 28. This heat exchange will result in production of a cold liquid (e.g., cold water) which then can be used (as indicated by stream line 42') to cool the single phase liquid 24. This can be done, for example, in zone 32 of heat exchanger 28.

Those skilled in the art will also appreciate that heat exchangers 26, 28 and 50 may have inlet and outlet stream conduits fixed in various manifold arrangements known to this art. That is to say that the various product streams from the Joule-Thompson free expansion can be manifolded to provide material mixing, surface area heat exchange capacity, etc. which can be used to provide flexibility in changing quantities and duties of the fluids employed in this process. In any case the principal effect of the "series" cooling should be that of progressive or stagewise cooling of the single composite liquid 24 so that a proper brink temperature $T_4$ is ultimately attained by said composite liquid before it arrives at the expansion nozzle 36. In any event one of the most desired products of the expansion can be the "pure" water 42' which can be collected in vessel 46. Again, in a preferred embodiment of this invention, some of this pure water 42' can be directed back, e.g., as by stream 51, to wash surface solute (e.g., brine) from the solid product 42 (e.g., ice) after it is removed (e.g., by conveyor belt means 54) from the vessel 38 in which the Joule-Thompson free expansion is conducted.

Again, one extremely important embodiment of this invention involves the case where all or part of the vapor phase product 40 is not reintroduced into the process (e.g., at inlet 21 of jet eductor 20) as a vapor stream, but rather is recompressed to a liquid and reintroduced into the process as a liquid from a pressurized container. For example, by means of appropriate settings of valves 58 and 59 the vapor stream 40 can be totally or partially directed away from the jet eductor 20 and sent to a mechanical compressor means 60 for compression to a liquid product which can be sent as a liquid stream 62 to point 66 as indicated (or sent to point 66 via a pressurized liquid storage tank 64).

In the same vein, via proper setting of valves 58' and 59', the vapor product 40' of the Joule-Thompson expansion can be recompressed by another compressor 60' and sent (optionally, via another storage vessel 64' under pressure) back into the process 10 at some other point such as point 66' of FIG. 3. Again, in some particularly preferred embodiments of this invention, injection of an appropriate liquid, gas-forming material (such as liquid $CO_2$) to a point in the process just before the Joule-Thompson free expansion can aid in achieving a proper jumping off temperature for carrying out the three-phase separations to which the herein disclosed processes are directed.

Figure 4:
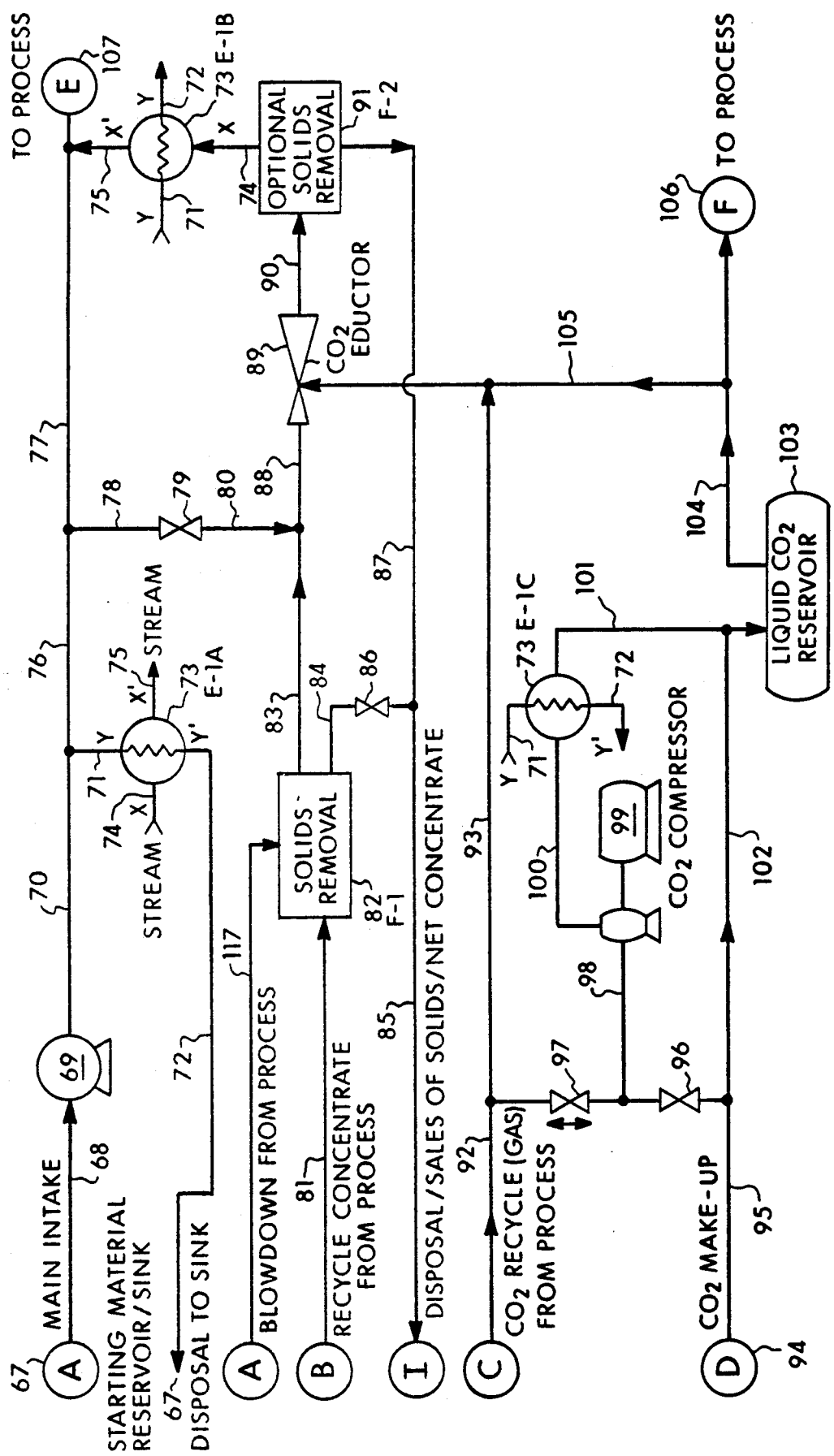
FIGS. 4 and 5 should be thought of as going together. When taken together, these two figures depict a process flow scheme for a generalized version of this invention which emphasizes recompression of a vapor phase product of the Joule-Thompson free expansion to a liquid form of gas-forming material and for reuse of such liquid in the process.
Figure 5:
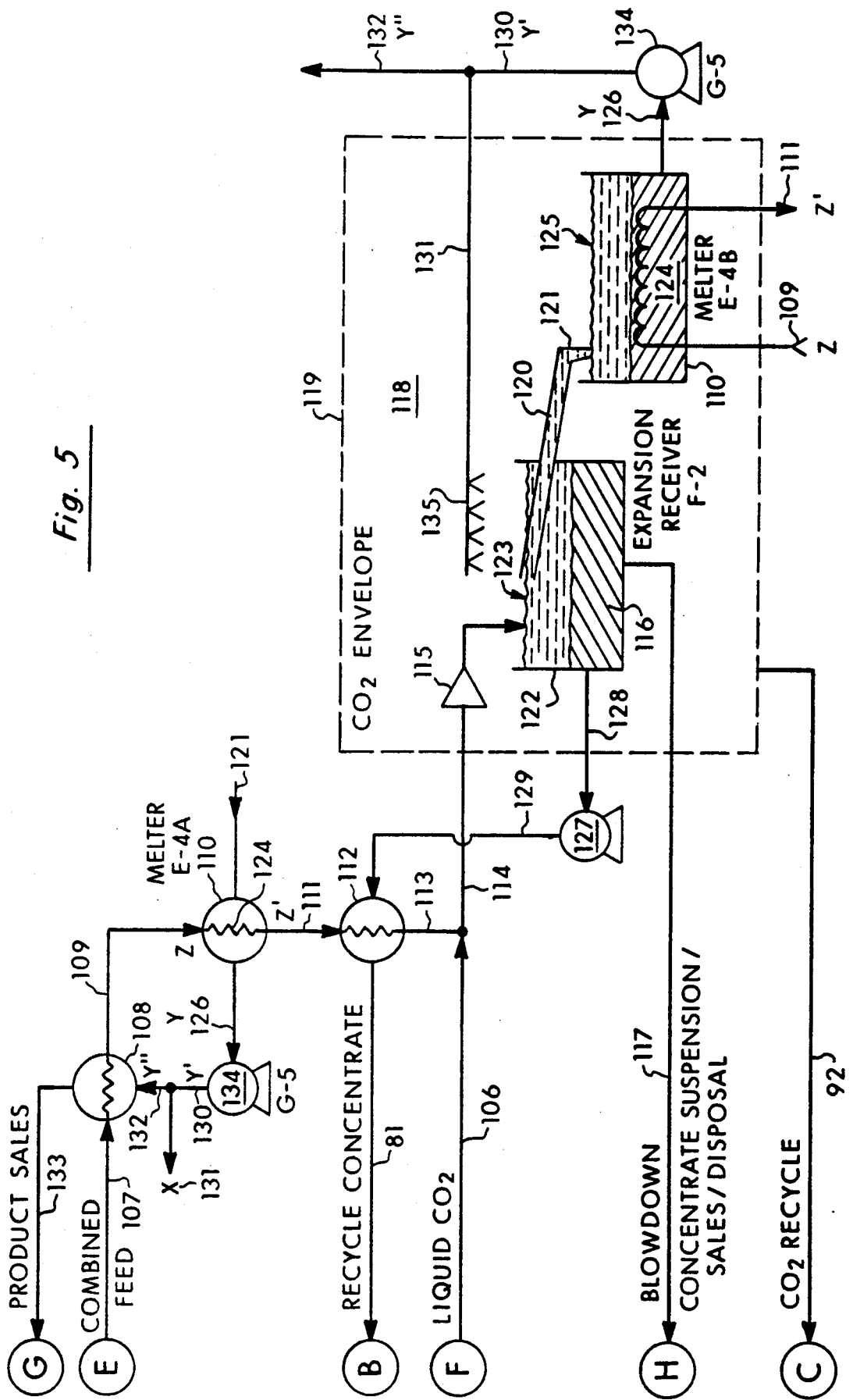

A somewhat more detailed flow diagram is shown, in two parts, in FIGS. 4 and 5. Together FIGS. 4 and 5 depict an application of the herein disclosed process which is particularly aimed at solvent recovery with concentration and blowdown of dissolved solutes and chemical precipitates. In this application, recovery and handling of frozen solvent is a major feature; although with some adaptation, the handling of solute recovery from compositions of high solute concentrations would be treated in analogous fashion. In any event, various, specific applications, within the wider significance of this technology, will require certain process step modifications and additions. A few examples of particular interest to this patent disclosure would include: (1) methods and points of removal of chemical precipitates depending on convenience and bulk (this also includes suspended insolubles of wastes, sewage, and sludge), (2) methods and physical disposition of solid phase handling at the point of three phase equilibrium, (3) states and relative quantities of vapor vs. liquid fluid injection, forms and sources of fluid supply to replace losses and/or consumption, (4) method of fluid recovery recompression and heat removal flexibility combined to economize power consumption by pressure, state and quantity selection, (5) sequence and strategy of refrigeration recovery in an exchange trains/melter of the product phases (flexibility in this respect can be achieved with valved piping manifolds), (6) provision and extent of backwash sprinklers depending on purity requirements, (7) recirculation and water-handling of carbonate-bicarbonate equilibrium for ease and economics of fluid recovery and make up and (8) media and variations of method(s) for elimination of fluid heats of solution and condensation in advance of certain other process steps.

Again, FIGS. 4 and 5 are best considered as a single version of this process which is divided into two convenient sections, i.e., FIG. 4 showing materials preparation/handing and FIG. 5 showing materials processing. These sections can be thought to interconnect for this purpose with respect to: (a) starting material—reservoir and sink, (b) recycled product liquid concentrate, (c) recycled process fluid, (d) fresh process fluid supply, vapor and/or liquid, (e) combined feed to process, (f) fluid total liquid to process, (g) purified product liquid to sales, (h) concentrated suspension to solids separation/disposal and (i) solids concentrate to sales/disposal.

For clarity, several pieces of equipment have been shown as separate features at their several points of diagrammatic logic, although each is a single process element. Such items of equipment will include items: 73 (E-1A/B/C Fluid Heat Of Solution/Compression Removal), 110 (E-4A/B Melter), 82, 91, (F-1, F-2), solids separation, also is optionally the same. Item 134 (G-5) is a melted product pump.

FIGS. 4 and 5 emphasize a "recycling" of a portion of the liquid (e.g., brine) product of the Joule-Thompson free expansion especially as a constant recycle quantity of said product. For example, FIG. 4 depicts such a process as starting when a quantity of starting material (e.g., seawater) is obtained from reservoir 67 and delivered via conduit 68 to a main intake pump 69. Discharge of this pump, via conduit 70, goes to a branch point from which conduit 71 takes a side stream of the starting material to a preliminary heat exchanger 73. From this exchanger 73 (shown as Item E-1A at this stage), a heat removal stream 71 is removed via conduit 72 and is disposed of by sending it back to reservoir 67 which thus serves as a sink. At the junction point of pump discharge 70, another branch conduit 76 is shown leading to a second junction point from which, via conduit 77, starting material may be delivered directly to process or sent, via conduit 78 (via valve 79 and conduit 80), to the motive fluid input 88 of eductor 89.

Meanwhile, a recycled concentrate of the liquid product of the process is delivered via conduit 81 to a preliminary and optional removal filter 82 (F-1). Together with this input material, blowdown from the process via conduit 117, may also be delivered to this optional filter 82. A discharge of the filter solids suspension (via conduit 84) is delivered via valve 86 to a junction point which joins a returning stream 87 and together (via conduit 85) are delivered to disposal and sales of solids and net concentrate. Clear recycle solution obtained from removal filter 82 (via conduit 83) is delivered, together with a previous stream of conduit 80, to the motive fluid input 88 of eductor 89.

Independently, $CO_2$ purchased or obtained from a $CO_2$ make up source 94 is delivered (via conduit 95) to a junction point and, depending on its state, goes either via valve 96 in the vapor state via a junction point either to the suction 98 of compressor 99 or via valve 97, joins fluid recycle vapor stream 93. If obtained as a liquid make-up, fluid goes directly via branch conduit 102, to a high pressure $CO_2$ liquid containing vessel 103.

Simultaneously, fluid in a vapor phase returned and recycled from the process via conduit 92, is delivered to a junction and branch valve 97 and to suction 98 of a fluid compressor 99 in order to join with new material from conduit 96. The discharge of compressor 99 (via conduit 100) is delivered to heat of compression removal exchanger 73 (shown at this stage as E-1C) which delivers heat of condensation to a stream of starting material which is disposed of to the reservoir as previously described. In any case the liquid condensate, under pressure delivered by compressor 99, via exchanger 73 and via conduit 101, is delivered to a reservoir of $CO_2$ in the liquid state, i.e., to reservoir vessel 103. A total fluid in the liquid state is delivered from reservoir 103 (via conduit 104) through a junction from which conduit 106 may deliver liquid fluid directly to process, or (via conduit 105) be delivered via a junction point to the intake of eductor 89 as a working fluid.

At the branch of conduit 92, conduit 93 delivers recycle fluid vapor from the process directly via a junction with conduit 105 to the suction of eductor 89 supplementing make-up working fluid. Compressed by eductor 89, combined fluid, recycle and intake starting material is delivered from the discharge of said eductor 89 via conduit 90 to optional filter 91 (F-2) which may or may not duplicate filter 82 depending upon the condition and solids content of suspension stream delivered via conduit 90. The suspension concentrate or solid removed by filter 91 is delivered via conduit 87 through the junction point (if it so exists) to join with the discharge of filter 82 and thence in combination is delivered via conduit 85 as before to disposal/sales of solids and net concentrates. The liquid clarified from the discharge of the eductor 89 by filter 91 is delivered, via conduit 74, to heat exchanger 73—again (here shown as E-1B), the exchanger serves to remove heat of solution via a side stream of main intake starting material and from this exchange a precooled effluent of eductor 89 is delivered via conduit 75 to a junction with conduit 77 and thence, via conduit 107, through the process as a combined starting material stream.

This stream is delivered to the first exchanger 108 of the heat exchange train in true counter flow for removal of heat by purified solvent liquid. From exchanger 108 the combined feed stream is delivered via conduit 109 to the next stage of cooling which is an exchanger shown here as E-4A, which in reality is a coil 124 within melter vessel 110. From this cooling coil the cooled starting combination feed is delivered via conduit 111 through the last exchanger of the exchanger train—recycle exchanger 112 and thence, via conduit 113, delivered to a junction point. Liquid fluid from the preparation section via 106 may there, optionally, be brought in and injected together with the starting material and the recycle in conduit 113 joining in conduit 114 to the input of expansion nozzle 115 as the composite solution at the system high state of pressure and temperature. Expanding through convergent nozzle or throttle 115 in Joule-Thompson free expansion, the material is delivered at process low state directly into an open expansion receiver 122 as a mixed phase of solids 123, liquid 116 and vapor contained in the space 118 retained in vapor-tight envelope 119 for recycling of vapor fluid.

Solid precipitates of a chemical nature settling to the bottom of receiver 122 are removed as a suspended blow-down via conduit 117 and returned as mentioned previously to solids removal filter 82 and thence via conduit 84, valve 86 and conduit 85 to disposal or sale of solids and net concentrates. The concentrated liquid product of the expansion in receiver 122, material 116, is removed via conduit 128 to the suction of recycle pump 127 and thence via its discharge 129 to the coolant element of recycle exchanger 112 where it supplies cooling to the incoming combined feed. The effluent of this cooling material from recycle exchanger 112 is conveyed via conduit 81, back to the materials handling section as mentioned previously.

Solid product of the Joule-Thompson free expansion, floating in expansion receiver 122, is conveyed by overflow or by conveyor or other convenient means 120 as a stream 121 to the melter 110 shown here as E-4B. There, melting coil 124 of melter 110 receives, via conduit 109, the incoming combined liquid which is then cooled and returned to the effluent side 111 of melter 110, also as mentioned previously. The melted purified product of the expansion material 125 is removed via conduit 126 to the suction of product pump 134 shown here as G-5 and delivered via conduit 130 to a junction point from which the branch conduit 131 delivers an optional sprinkler quantity to rinse the overflow solids 121 from expansion receiver 122 using sprinkler 135. The other branch, conduit 132, conveys melted product to product exchanger 108 the initial stage of exchange for cooling of the incoming combined solution. The warmed effluent of that exchanger is delivered via conduit 133 to product sales. Lastly, fluid vapor released in the expansion and held in the fluid envelope 119 is drawn via conduit 92, as mentioned above to the suction of eductor 89 and/or the suction of compressor 99 for recycling.

Finally, it should be understood that the herein disclosed processes should in no way be limited to the examples and figures given above, but rather the full scope and spirit of this patent disclosure should only be limited by the claims which follow.

Thus having disclosed this invention, what is claimed is:

1. A process for separating a solute from a solvent which together constitute a solute/solvent solution starting material having an initial solute concentration and an initial temperature $T_1$, said process comprising:
   (1) combining the solute/solvent solution with a constant recycle quantity of a liquid product of increased solute concentration obtained from a Joule-Thompson free expansion step of this process and used as a circulating inventory of said concentrated liquid product which is recycled in an amount adjusted to control a solute concentration of a combined solution comprised of a portion of the solute/solvent solution and a portion of the liquid product of increased solute concentration;

(2) dissolving into said combined solution, under a system high pressure state, a controlled amount of a fluid material X which will constitute a vapor phase at a system low temperature and pressure state which exists after the Joule-Thompson free expansion step, in order to produce a fluid material X/solute/solvent solution which constitutes a single phase, composite solution of a given overall composition;

(3) removing any heat of solution and/or heat of condensation of the single phase composite solution and removing sensible heat of said composite solution in a stage-wise manner so as to transit successive temperatures $T_2$ and $T_3$ to reach a lower, jumping off temperature $T_4$ while still essentially at the nominal high pressure;

(4) releasing said nominal high pressure in a Joule-Thompson free expansion to a system low pressure in order to reach a system low temperature $T_5$ and thereby achieving a solid-liquid-gas equilibrium state (triple point) of the single phase composite solution; while simultaneously:

(a) evolving substantially all dissolved fluid material X into an evaporated gaseous phase which will have absorbed its heat of vaporization from any remaining solvent and any remaining solute;

(b) distributing any remaining solvent and solute into a solid phase product of pure solvent and a liquid phase product;

(5) separating the solid phase as a product, and (6) separating the liquid phase into a constant recycle quantity and a remaining "blowdown" quantity composed of total solute of the starting material and unsolidified remaining solvent of the starting material in proportions up to and approaching eutectic (solubility) proportions of the starting material solute and solvent.

2. The process of claim 1 wherein the fluid material X is liquid carbon dioxide.

3. The process of claim 1 wherein the fluid material X is gaseous carbon dioxide.

4. The process of claim 1 wherein the solute/solvent solution starting material is an aqueous solution and the solid phase product is ice.

5. The process of claim 1 wherein the vapor phase product is carbon dioxide gas which is thereafter recompressed into liquid carbon dioxide and reintroduced into the combined solution.

6. The process of claim 1 wherein any portion of any cooling used in going from $T_1$ (via $T_2$ and $T_3$) to $T_4$ is achieved by heat removal procedures selected from the group consisting of mechanical refrigeration, injection of liquid carbon dioxide and heat exchange with product(s) of the Joule-Thompson free expansion.

7. The process of claim 1 wherein the liquid product of the Joule-Thompson expansion is entirely returned to an inventory of starting material following separation of the solid phase of purified component originally present in excess of eutectic composition.

8. The process of claim 1 wherein the jumping off temperature $T_4$ is achieved through use of a source of refrigeration which is external to this process.

9. The process of claim 1 wherein a product of the Joule-Thompson free expansion is heat exchanged with an incoming combined solution.

10. The process of claim 1 wherein liquid carbon dioxide is introduced into the single phase, composite solution in order to aid said single phase, composite solution in attaining the jumping off temperature.

11. The process of claim 1 wherein any portion of cooling used in going from $T_1$ (via $T_2$ and $T_3$) to $T_4$ is achieved by injection of liquid carbon dioxide into the process.

12. The process of claim 1 wherein the distributing of any remaining solvent and solute into a solid phase product of pure solvent and a liquid phase product, does not take place, but rather, because of solute concentration, temperature and/or pressure adjustments to the single phase, composite solution, such distributing of any remaining solvent and solute results in a solid phase product of substantially pure, solid phase, solute which is precipitated from the liquid phase product as a result of the single phase, composite solution undergoing the Joule-Thompson free expansion.

13. A process for separating a solute from a solvent which together constitute a solute/solvent solution starting material having an initial solute concentration, said process comprising:

(1) combining a portion of solute/solvent solution starting material with a constant recycle quantity of a liquid phase product of a Joule-Thompson free expansion step of this process in order to produce a composite solution of increased solute concentration and in order to aid in production of a single phase liquid composite solution which will have a given overall solute concentration greater than the initial concentration of the solute/solvent solution starting material;

(2) dissolving into said composite solution of increased solute concentration, a controlled amount of a fluid X (which will go into a vapor phase at a system low pressure state which exists after the Joule-Thompson free expansion step), in order to produce a fluid X/solute/solvent composite solution;

(3) placing the fluid X/solute/solvent composite solution under a system nominal high pressure state;

(4) removing heat of mixing and/or heat of condensation (resulting from dissolving fluid X in the solute/solvent solution) and/or sensible heat from the fluid X/solute/solvent composite solution and thereby producing a single phase liquid composite solution having a given overall solute concentration, a nominal high pressure state and a desired jumping off temperature;

(5) releasing the single phase liquid composite solution from the nominal high pressure state to a nominal low pressure state via a Joule-Thompson free expansion in order to achieve a solid-liquid-gas equilibrium state of the single phase liquid composite solution by: (a) evaporating substantially all dissolved fluid X as a vapor phase product which absorbs its heat of vaporization from the solvent and solute in said single phase liquid composite solution, (b) distributing any solvent and solute remaining after said equilibrium state is reached into a solid phase product of substantially pure solvent and a liquid phase product comprised of any solvent which does not go into the solid phase product and any solute originally contained in the single phase liquid composite solution and thereby producing a liquid phase product having a solute concentration greater than the solute concentration of the solute/solvent solution starting material, and (c) lowering the temperature of the vapor phase product, the liquid phase product and the solid phase product to a temperature which is just above the eutectic temperature of the single phase liquid composite solution;

(6) apportioning the liquid phase product into a constant recycle quantity and a remainder quantity;

(7) recycling the constant recycle quantity of the liquid phase product and combining it with an incoming portion of solute/solvent solution starting material; and (8) removing the solid phase product as an end product of this process.

14. The process of claim 13 wherein the fluid X is liquid carbon dioxide.

15. The process of claim 13 wherein the fluid X is gaseous carbon dioxide.

16. The process of claim 13 wherein the solute/solvent solution starting material is seawater.

17. The process of claim 13 wherein the solid phase product is a solid form of substantially pure solvent which is washed with pure solvent to remove any liquid phase product on the surface of said solid phase product.

18. The process of claim 13 wherein the solute/solvent solution starting material is a nonaqueous solution containing dissolved minerals.

19. The process of claim 13 wherein the solute/solvent solution starting material is an aqueous industrial waste fluid.

20. The process of claim 13 wherein the jumping off temperature is achieved through use of a source of refrigeration which is external to this process.

21. The process of claim 13 wherein a product of the Joule-Thompson free expansion is heat exchanged against an incoming single phase composite liquid before said product of the Joule-Thompson free expansion is returned to an initial stage of the process.

22. The process of claim 13 wherein liquid carbon dioxide is introduced into the single phase composite liquid in order to aid said composite liquid in attaining the jumping off temperature.

23. The process of claim 13 wherein the vapor phase product is collected and mechanically recompressed into a liquid product for reuse in the process.

24. The process of claim 13 wherein the liquid product of the Joule-Thompson expansion is entirely returned to an inventory of starting material following separation of the solid phase of purified component originally present in excess of eutectic composition.

25. The process of claim 13 wherein the constant recycle quantity of the liquid phase product is an output product of a blowdown procedure performed upon the liquid phase product of the Joule-Thompson free expansion.

26. The process of claim 13 wherein the distributing of any solvent and solute remaining after the equilibrium state is reached into a solid phase product of substantially pure solvent and a liquid phase product having a solute concentration greater than the solute concentration of the solute/solvent solution starting material, does not take place, but rather, because of solute concentration, temperature and/or pressure adjustments to the single phase liquid composite solution, such distributing of any solvent and solute remaining after said equilibrium state is reached results in production of a solid phase product of substantially pure, solid phase, solute precipitated from the liquid phase product as a result of the single phase liquid composite solution undergoing the Joule-Thompson free expansion.

27. A process for separating a solute from a solvent which together constitute a solute/solvent solution starting material having an initial solute concentration, said process comprising:

(1) dissolving a gas-forming material into the solute/solvent solution in order to produce a dissolved gas/solute/solvent solution;

(2) placing the dissolved gas/solute/solvent solution under a nominal high pressure;

(3) lowering the temperature of the dissolved gas/solute/solvent solution to a jumping off temperature in order to produce a single phase liquid having a solute concentration, temperature and nominal high pressure which are such that a release of the nominal high pressure from said single phase liquid to a nominal low pressure results in evaporation of substatially all of the gas-forming material as a gas which takes its heat of vaporization in an amount such that the temperature of an entire mass of the single phase liquid is lowered to a temperature which approximates the triple point temperature of said single phase liquid;

(4) subjecting the single phase liquid to a Joule-Thompson free expansion into a vessel having a nominal system low pressure and thereby obtaining three phases of resultant materials which each have a temperature approximating the triple point temperature of the single phase liquid and wherein said three phases of resultant materials comprise a gas phase product containing the gas-forming material originally dissolved in the solute/solvent solution starting material, a liquid phase product having a solute concentration greater than the initial concentration of the solute/solvent solution starting material and a solid phase product of substantially pure solvent;

(5) collecting at least one of the three phases of resultant materials as a product of the process; and (6) recycling at least one of the three phases of resultant materials back into an earlier stage of the process.

28. The process of claim 27 wherein the gas-forming material is liquid carbon dioxide.

29. The process of claim 27 wherein the gas-forming material is gaseous carbon dioxide.

30. The process of claim 27 wherein the solute/solvent solution starting material is seawater.

31. The process of claim 27 wherein the liquid phase product is a potassium sulfate solution obtained as a by-product of a cement manufacturing process.

32. The process of claim 27 wherein the solute/solvent solution starting material is an aqueous solution containing dissolved minerals and the solid phase product is ice which is thereafter melted and used in the production of a carbonated beverage.

33. The process of claim 27 wherein the solute/solvent solution starting material is a nonaqueous industrial waste fluid.

34. The process of claim 27 wherein the liquid phase product is a brine of nearly eutectic solute concentration from which magnesium carbonate is recovered.

35. The process of claim 27 wherein a quantity of the liquid phase product containing a solute concentration greater than the initial concentration of the solute/solvent solution starting material is recycled to an earlier stage of the process as a constant recycle quantity of said liquid phase product.

36. The process of claim 27 wherein the liquid phase product is subjected to a blowdown procedure and a product of said blowdown procedure is recycled back to an earlier stage of the process as a constant recycle quantity of said product.

37. The process of claim 27 wherein the liquid phase product is separated into a constant recycle quantity and a remaining "blowdown" quantity composed of the starting material total solute and the unsolidified liquid remainder of starting material solvent in proportions up to and approaching eutectic (solubility) composition of the starting material.

38. The process of claim 27 wherein the liquid product of the Joule-Thompson expansion is entirely returned to the inventory of starting material following separation of the solid phase of purified component originally present in excess of eutectic composition.

39. The process of claim 27 wherein liquid carbon dioxide is introduced into the single phase liquid in order to aid said liquid in attaining the jumping off temperature.

40. The process of claim 27 wherein the gas-forming material is carbon dioxide gas which is thereafter mechanically recompressed and reused in the form of liquid carbon dioxide in said process.

41. The process of claim 27 wherein the solid phase product does not have a solute concentration substantially less than the initial concentration of the solute/solvent solution starting material, but rather, because of solute concentration, temperature and/or pressure adjustments to the single phase liquid, is a solid phase product of substantially pure, solid phase, solute which is precipitated from the liquid phase product as a result of said single phase liquid undergoing the Joule-Thompson free expansion.

42. A process for separating a dissolved salt from seawater which together constitute a dissolved salt/seawater solution starting material having an initial dissolved salt concentration and an initial temperature, said process comprising:

(1) placing the dissolved salt/seawater solution under a system high pressure state;

(2) dissolving into said dissolved salt/seawater solution, a controlled amount of a fluid X which will go into a vapor phase at a system low pressure state which exists just after a Joule-Thompson free expansion step of this process;

(3) recycling a quantity of a brine liquid product of said Joule-Thompson free expansion step as a constant recycle quantity which is combined with an incoming portion of seawater in an amount necessary to achieve a desired dissolved salt concentration in a resulting fluid X/dissolved salt/seawater composite solution;

(4) removing heat of mixing and/or heat of condensation present in the resulting fluid X/dissolved salt/seawater composite solution as a result of dissolving fluid X in said dissolved salt/seawater solution;

(5) removing sensible heat from the fluid X/dissolved salt/seawater composite solution in order to achieve a single phase liquid composite solution having a desired jumping off temperature;

(6) releasing, via a Joule-Thompson free expansion, the single phase liquid composite solution having the desired jumping off temperature from a system high pressure state to a system low pressure state and thereby: (a) evaporating substantially fluid X contained in the single phase liquid composite solution, (b) producing a solid-liquid-vapor equilibrium state in order to produce a vapor phase product comprised of fluid X which absorbs its heat of vaporization from a solid phase product of pure ice and from a brine liquid phase product having a salt concentration greater than the salt concentration of the dissolved salt-seawater solution starting material, (c) producing brine liquid phase product, and (d) distributing a water component of the seawater starting material into the solid phase product of pure ice and into a brine liquid phase product having a dissolved salt concentration near the eutectic concentration of the single phase liquid composite solution;

(7) separating the brine liquid phase product into a constant recycle quantity and a remaining "blowdown" quantity composed of the starting material total solute and a unsolidified liquid remainder of starting material solvent in proportions up to (but not reaching) eutectic (solubility) composition of the single phase liquid composite solution;

(8) washing the solid phase product of pure ice to remove any surface brine; and (9) melting the solid phase product of pure ice and thereby obtaining pure water as a product of this process.

43. The process of claim 42 wherein the fluid X is liquid carbon dioxide.

44. The process of claim 42 wherein the dissolved salt is magnesium carbonate.

45. The process of claim 42 wherein the liquid product of the Joule-Thompson expansion is entirely returned to the inventory of starting material following separation of the solid phase of purified component originally present in excess of eutectic composition.

46. The process of claim 42 wherein the distributing of the dissolved salt contained in the single phase liquid composite solution to a brine liquid phase product does not take place, but rather, because of solute concentration, temperature and/or pressure adjustments to the single phase liquid composite solution, the distribution results in production of a solid phase product of substantially pure, solid phase, salt precipitated from the brine liquid phase product as a result of the single phase liquid composite solution undergoing the Joule-Thompson free expansion.

47. A process for separating a solute from an aqueous solvent which together constitute a solute/aqueous solvent solution starting material having an initial solute concentration and an initial temperature $T_1$, said process comprising:

(1) dissolving liquid carbon dioxide into said solute/aqueous solvent solution in order to: (a) dissolve the liquid carbon dioxide in the solute/aqueous solvent solution and thereby produce a carbon dioxide/solute/aqueous solvent solution, and (b) produce a carbon dioxide/solute/aqueous solvent solution which takes the form of a single phase composite liquid having a second temperature $T_2$ which is lower than the initial temperature $T_1$ of the solute/solvent solution starting material and which temperature $T_2$ constitutes a jumping off temperature which is such that a release of pressure from the single phase composite liquid from a nominal high pressure to a nominal low pressure results in evolution of substantially all of the carbon dioxide in said single phase composite liquid as carbon dioxide vapor which absorbs its heat of vaporization in a quantity of heat which is such that its loss lowers the temperature of an entire mass of the single phase composite liquid to a temperature $T_3$ which approximates the triple point temperature of said single phase composite liquid;

(2) placing the single phase composite liquid under a nominal high pressure at temperature $T_2$;

(3) subjecting the single phase composite liquid to a Joule-Thompson free expansion into a vessel having a nominal system low pressure and thereby producing a three-phase separation of the single phase composite liquid and thereby producing three phases of resultant materials which each have a temperature $T_3$ which approximates the triple point temperature of the single phase composite liquid and wherein said three phases of resultant materials include a carbon dioxide vapor phase product, an aqueous liquid phase product having a solute concentration which approaches the eutectic concentration of the solute in the single phase composite liquid solution, and a solid phase, ice product;

(4) collecting the solid phase, ice product of the three-phase separation;

(5) removing any liquid phase product from the surface of the solid phase, ice product;

(6) melting the solid phase, ice product of the three-phase separation to obtain a substantially pure water; and (7) recycling a portion of the aqueous liquid phase product as a constant recycle quantity of said liquid phase product and mixing said constant recycle quantity with an incoming portion of the solute/aqueous solvent solution starting material.

48. The process of claim 47 wherein the aqueous liquid phase product of the Joule-Thompson expansion is entirely returned to an inventory of starting material following separation of the solid phase product.

49. A process for separating a solute from a solvent which together constitute a solute/solvent solution starting material having an initial solute concentration said process comprising:

(1) dissolving into said solute/solvent solution, a controlled amount of a fluid X (which will constitute a vapor phase at a system low temperature and pressure state which will exist after a Joule-Thompson free expansion step of this process), in order to produce a fluid X/solute/solvent solution;

(2) placing the fluid X/solute/solvent solution under a nominal high pressure;

(3) lowering the temperature of the fluid X/solute/solvent solution to a jumping off temperature in order to produce a single phase liquid solution having a solute concentration, temperature and nominal high pressure which are such that a release of the nominal high pressure from said single phase liquid solution to a nominal low pressure will result in production of a solid-liquid-gas equilibrium state (triple point) of the single phase liquid solution;

(4) subjecting the single phase liquid solution to a Joule-Thompson free expansion into a vessel having the nominal system low pressure and thereby:

(a) evaporating all of the fluid X as a vapor which takes its heat of vaporization in an amount such that the temperature of an entire mass of the single phase liquid solution is lowered to a temperature which approximates the triple point temperature of the single phase solution, (b) producing a solid-liquid-gas equilibrium state (triple point) of the single phase liquid solution;

(c) evolving a portion of the solute as a substantially pure, solid phase, solute product, (d) producing a liquid phase product, and (e) distributing the solute into a substantially pure, solid phase, solute product and into a liquid phase product comprised of the solvent of the starting material and any remaining solute which is not contained in the pure, solid phase, solute product;

(5) separating the pure, solid phase, solute product from the liquid phase product; and (6) recycling a constant recycle quantity of a liquid phase product (from which the pure, solid phase, solute product is removed) to a prior stage of the process.

50. The process of claim 49 wherein the fluid X is liquid carbon dioxide.

51. The process of claim 49 wherein the fluid X is gaseous carbon dioxide.

52. The process of claim 49 wherein the solute/solvent solution starting material is seawater.

53. The process of claim 49 wherein the solute/solvent solution starting material is seawater and the pure, solid phase, solute product is magnesium carbonate.

54. The process of claim 49 wherein the solute/solvent solution starting material is seawater and the pure, solid phase, solute product is a mixture of magnesium carbonate and sodium chloride.

55. The process of claim 49 wherein the solute/solvent solution starting material is a nonaqueous, industrial waste liquid.

56. The process of claim 49 wherein the liquid phase product of the Joule-Thompson expansion is entirely returned to an inventory of starting material following separation of the solid phase product.

57. The process of claim 49 wherein the jumping off temperature is achieved through use of a source of refrigeration which is external to this process.

58. The process of claim 49 wherein a product of the Joule-Thompson free expansion is heat exchanged against an incoming single phase composite liquid before said product of the Joule-Thompson free expansion is returned to an initial stage of the process.

59. The process of claim 49 wherein liquid carbon dioxide is introduced into the fluid X/solute/solvent solution in order to aid said solution in attaining the jumping off temperature.

60. The process of claim 49 wherein the vapor phase product is carbon dioxide gas which is mechanically recompressed and reused in the form of liquid carbon dioxide in said process.

61. The process of claim 49 wherein the constant recycle quantity of the liquid phase product is an output product of a blowdown procedure performed upon the liquid phase product of the Joule-Thompson free expansion.

62. The process of claim 49 wherein the liquid phase product is separated into a constant recycle quantity and a remaining "blowdown" quantity composed of the starting material total solute and an unsolidified liquid remainder of starting material solvent in proportions up to and approaching eutectic (solubility) composition of the starting material components.

* * * * *